March 30, 1926.
E. I. BRADDOCK
1,579,071
METHOD OF AND APPARATUS FOR MAKING WIRE NAILS AND LIKE ARTICLES
Filed April 25, 1921    19 Sheets-Sheet 5
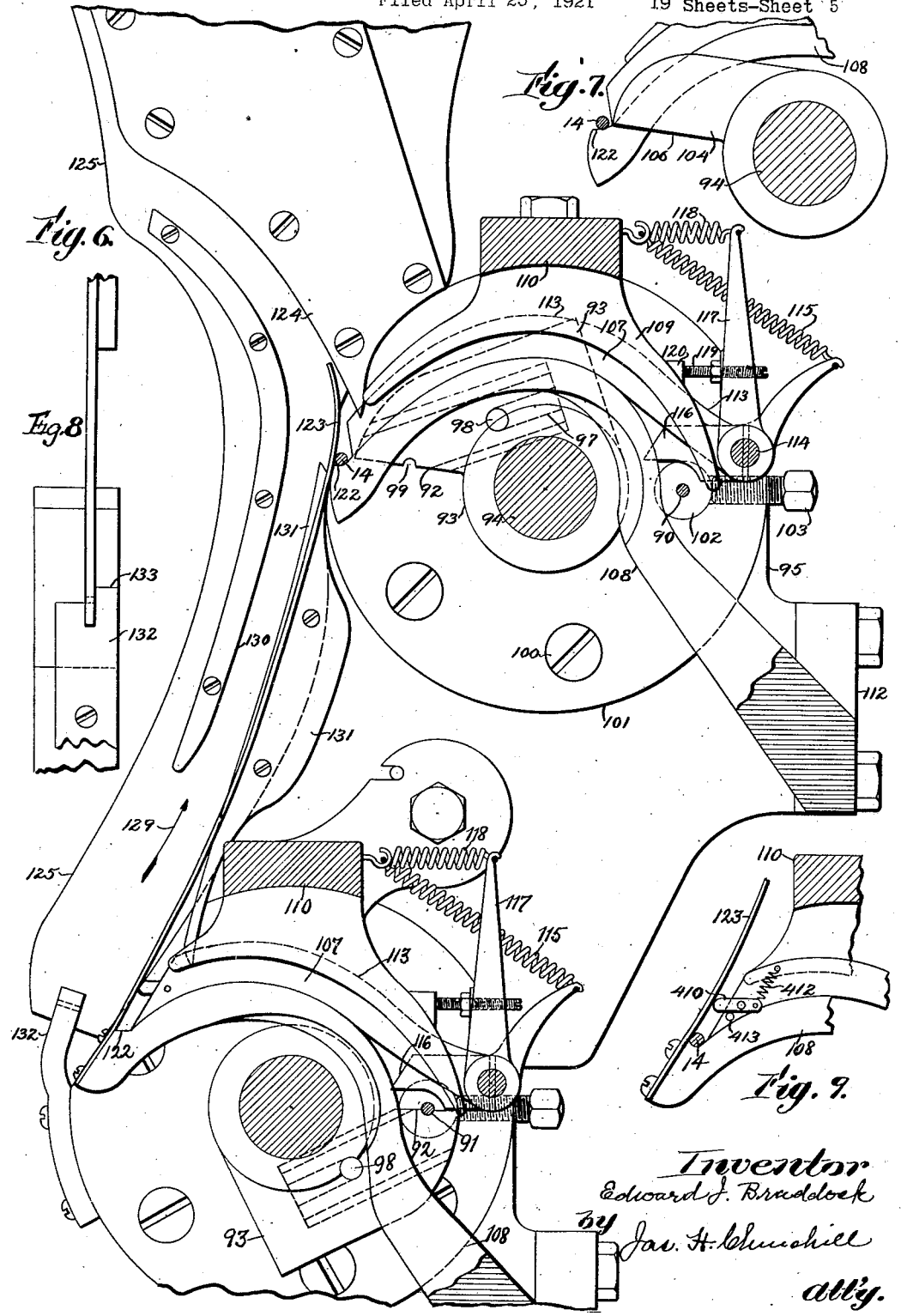

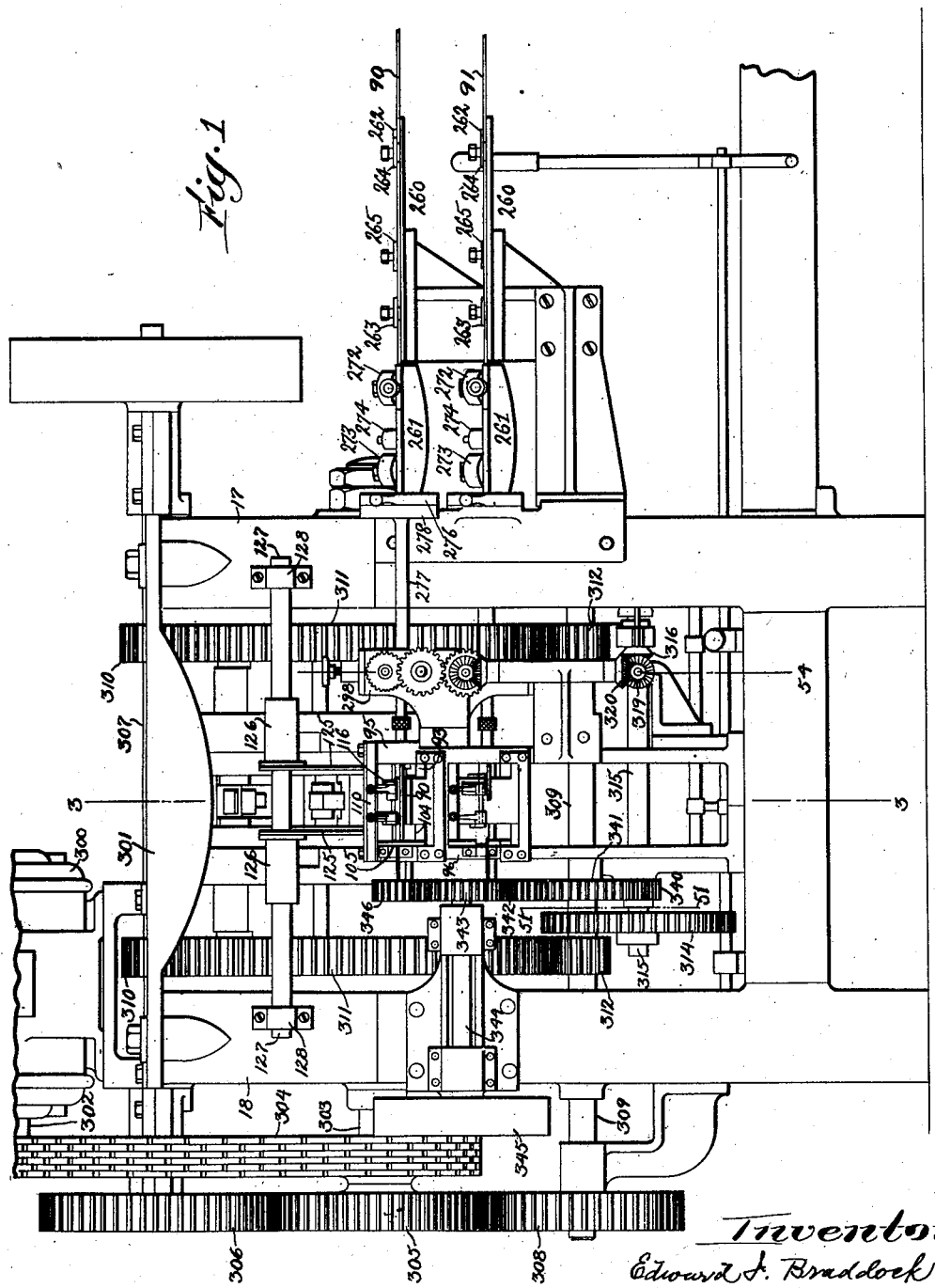

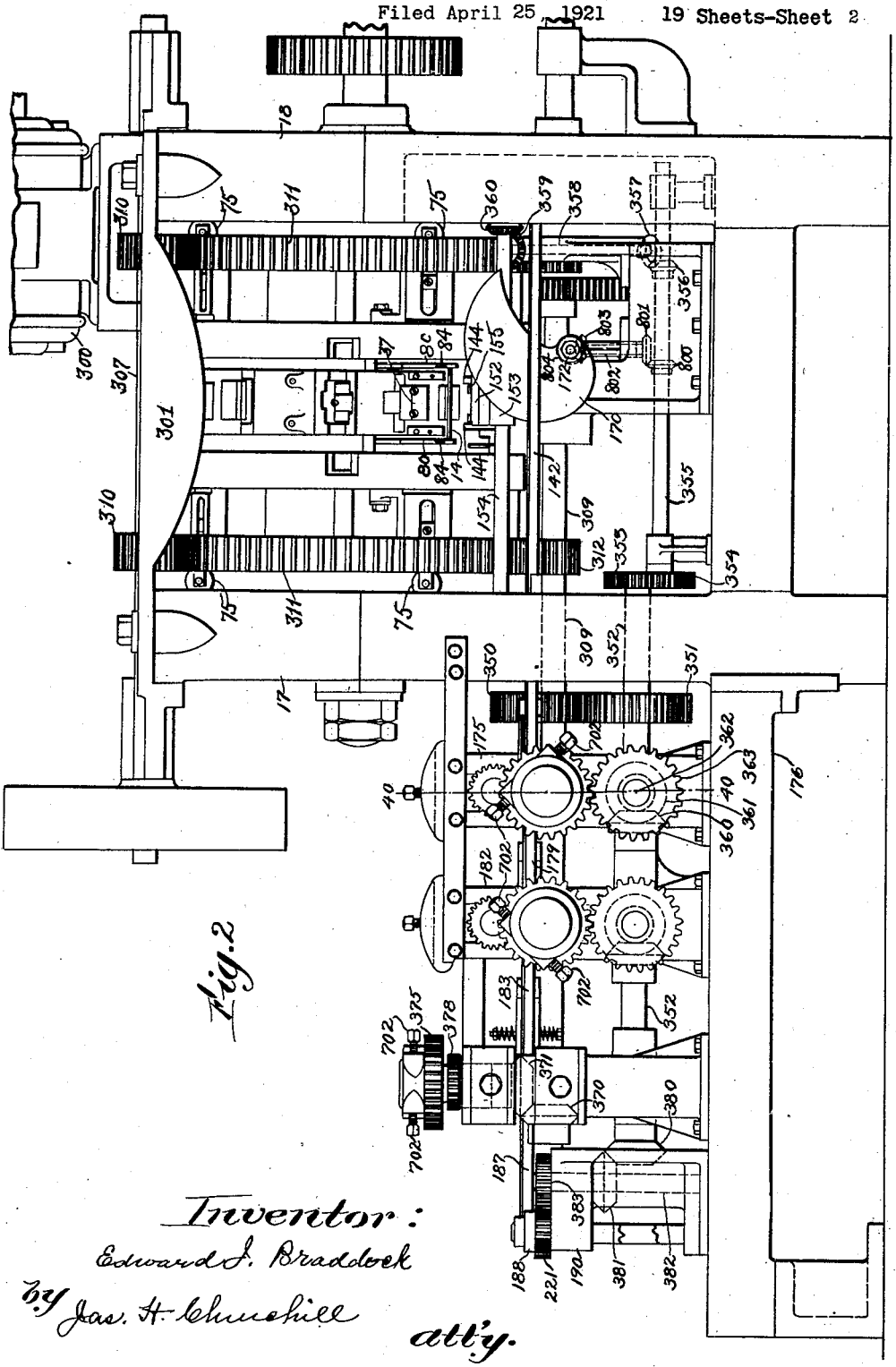

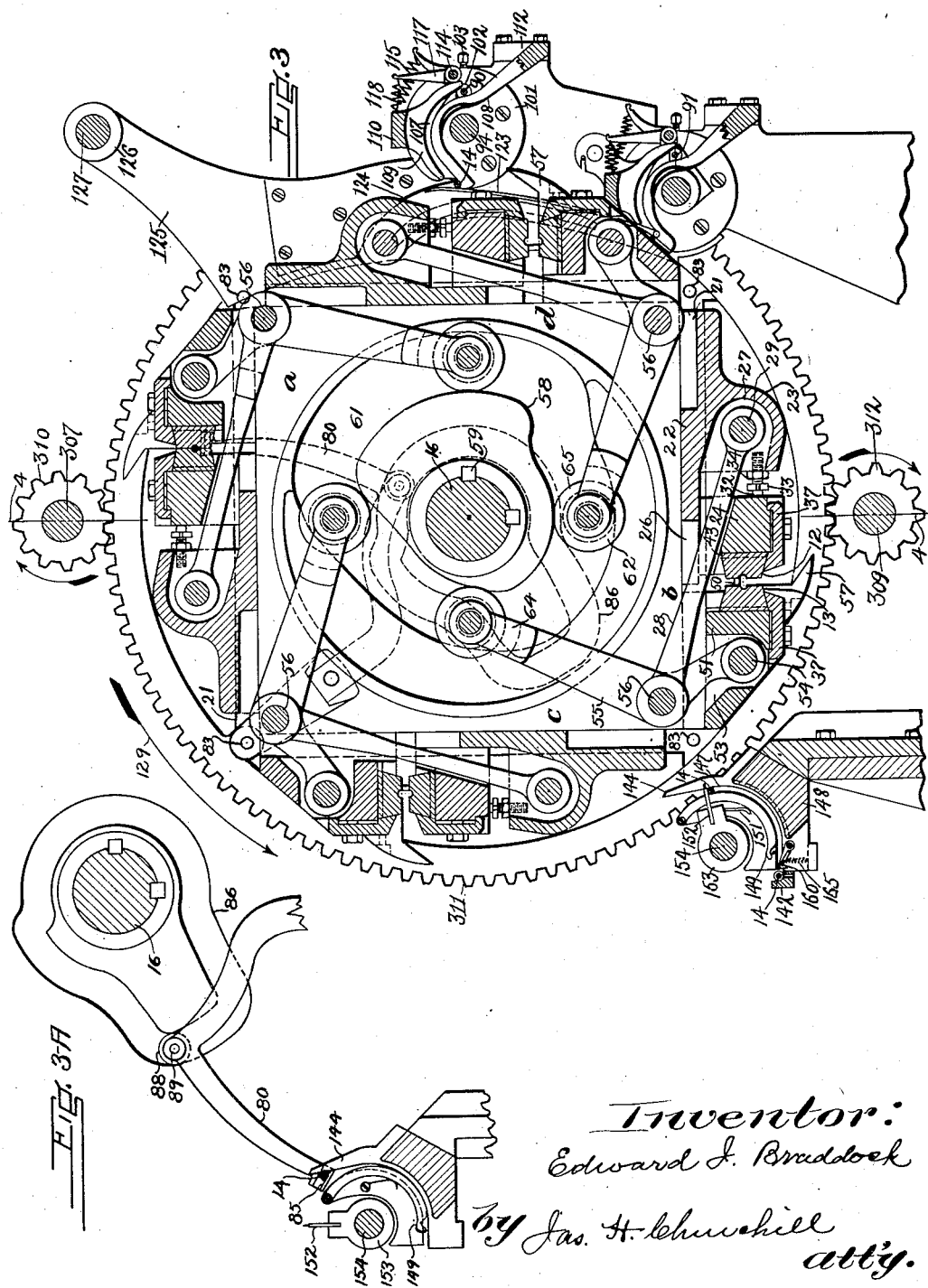

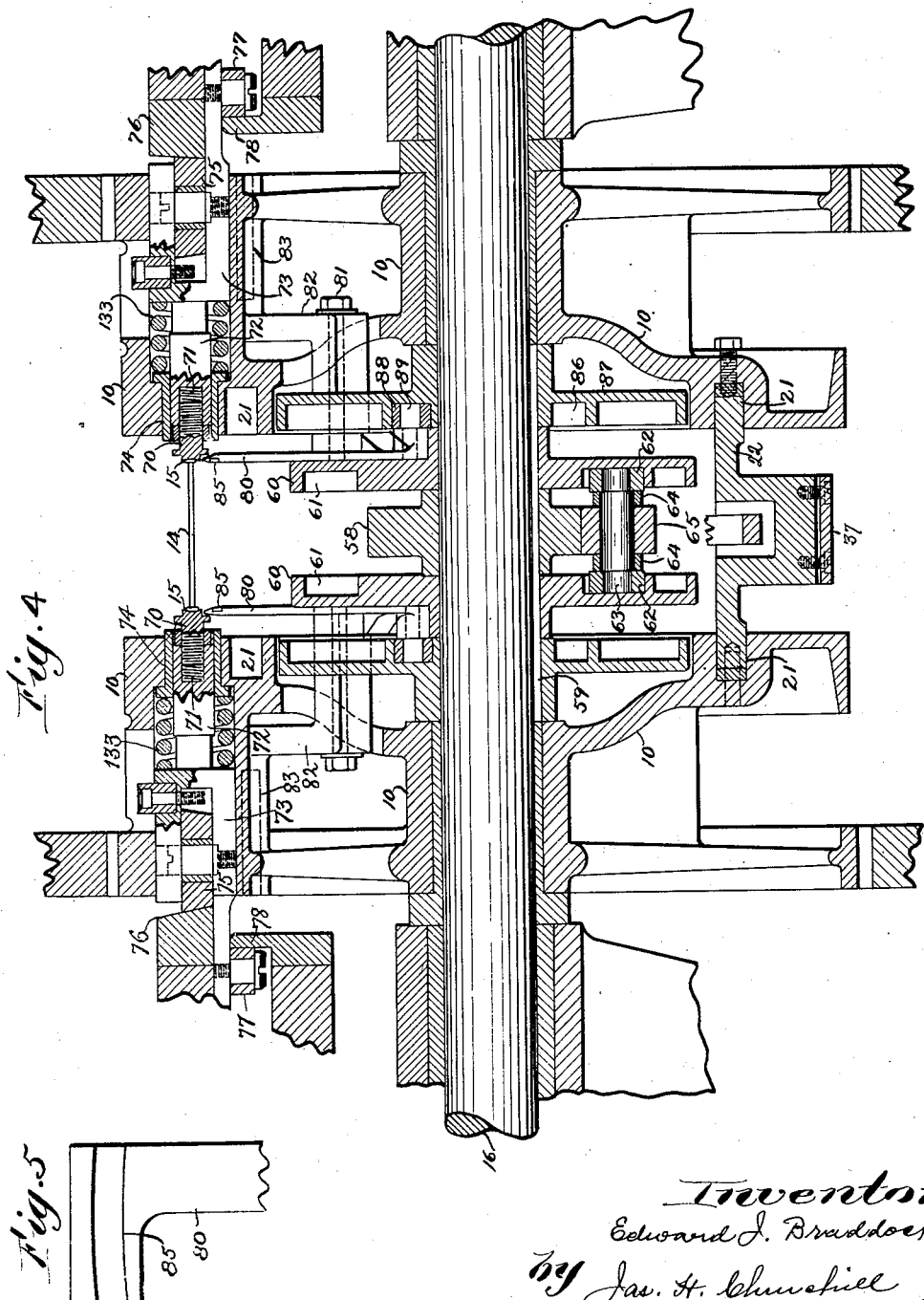

March 30, 1926. 1,579,071
E. I. BRADDOCK
METHOD OF AND APPARATUS FOR MAKING WIRE NAILS AND LIKE ARTICLES
Filed April 25, 1921 19 Sheets-Sheet 6

Inventor:
Edward I. Braddock
by Jas. H. Churchill atty.

March 30, 1926. 1,579,071
E. I. BRADDOCK
METHOD OF AND APPARATUS FOR MAKING WIRE NAILS AND LIKE ARTICLES
Filed April 25, 1921 19 Sheets-Sheet 7

Inventor:
Edward I. Braddock
by Jas. H. Churchill
atty.

March 30, 1926.  
E. I. BRADDOCK  
1,579,071  
METHOD OF AND APPARATUS FOR MAKING WIRE NAILS AND LIKE ARTICLES  
Filed April 25, 1921  19 Sheets-Sheet 8

Inventor:
Edward I. Braddock
by Jas. H. Churchill
atty.

March 30, 1926.
E. I. BRADDOCK
1,579,071
METHOD OF AND APPARATUS FOR MAKING WIRE NAILS AND LIKE ARTICLES
Filed April 25, 1921  19 Sheets-Sheet 9
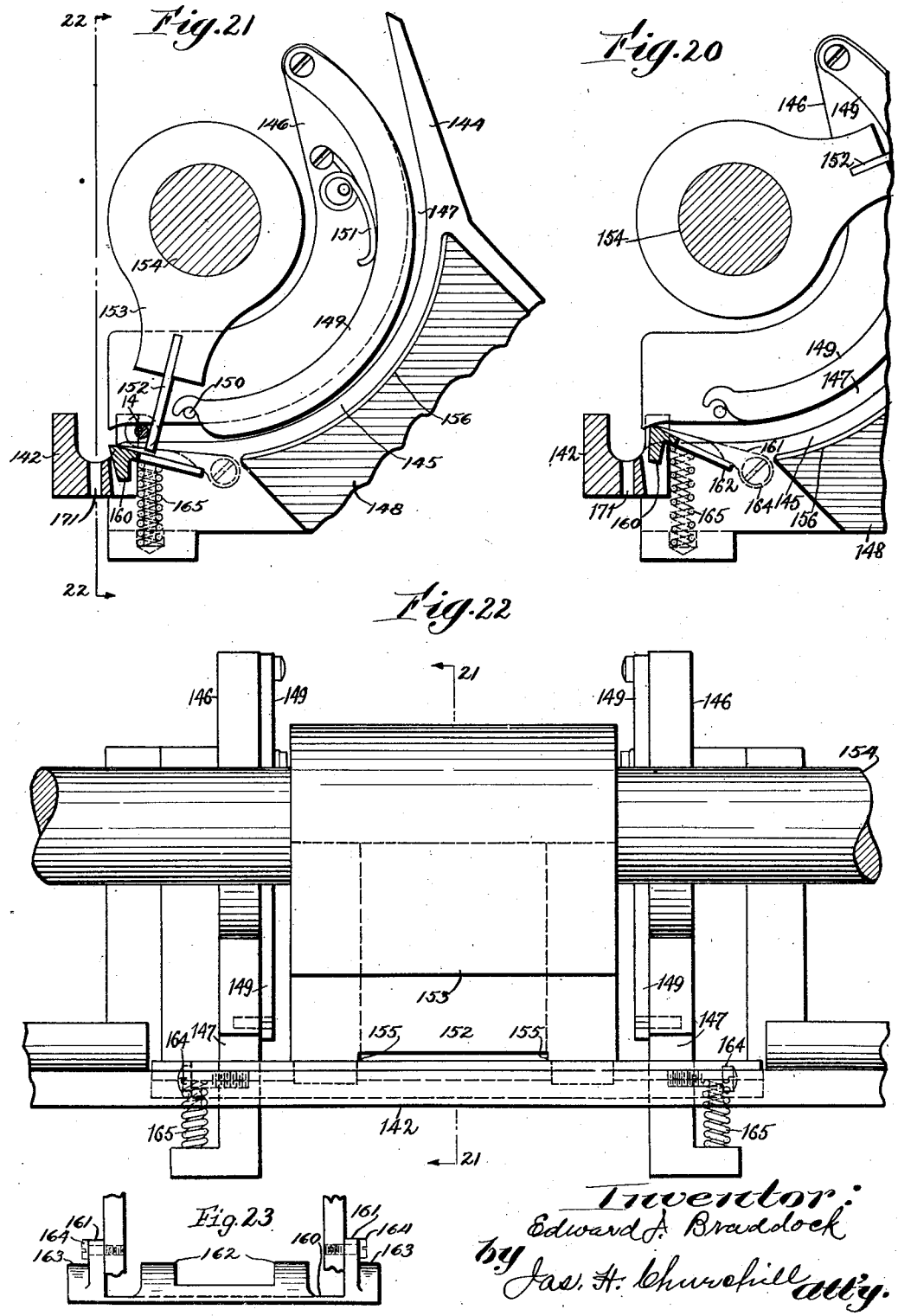

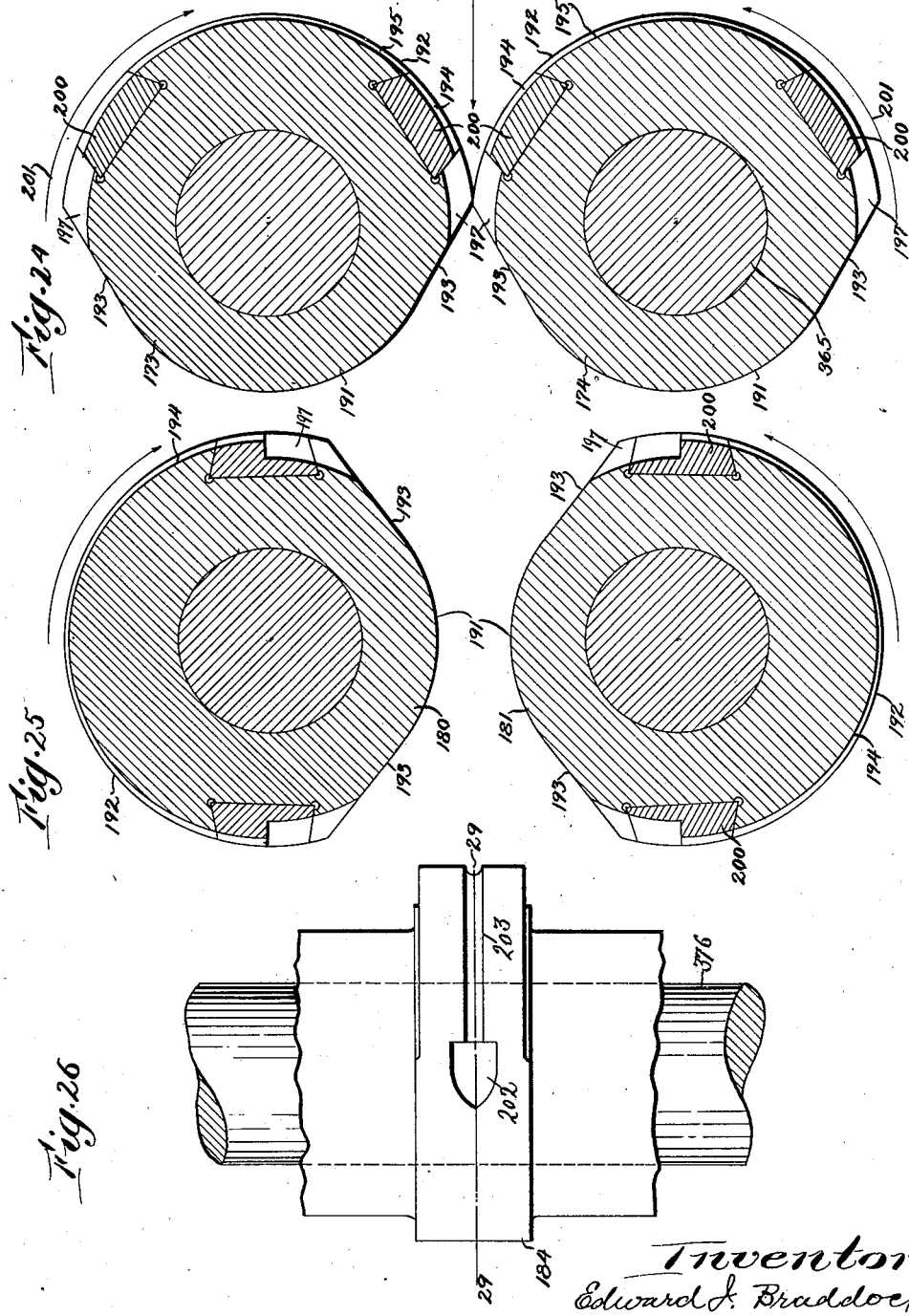

March 30, 1926. 1,579,071
E. I. BRADDOCK
METHOD OF AND APPARATUS FOR MAKING WIRE NAILS AND LIKE ARTICLES
Filed April 25, 1921 19 Sheets-Sheet 11
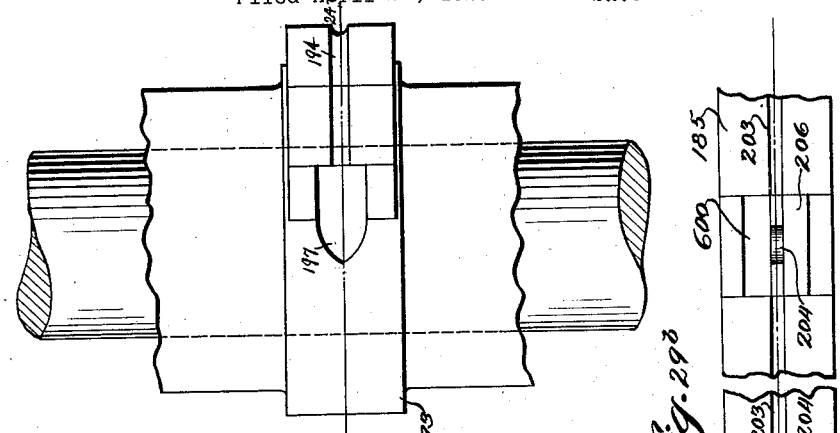
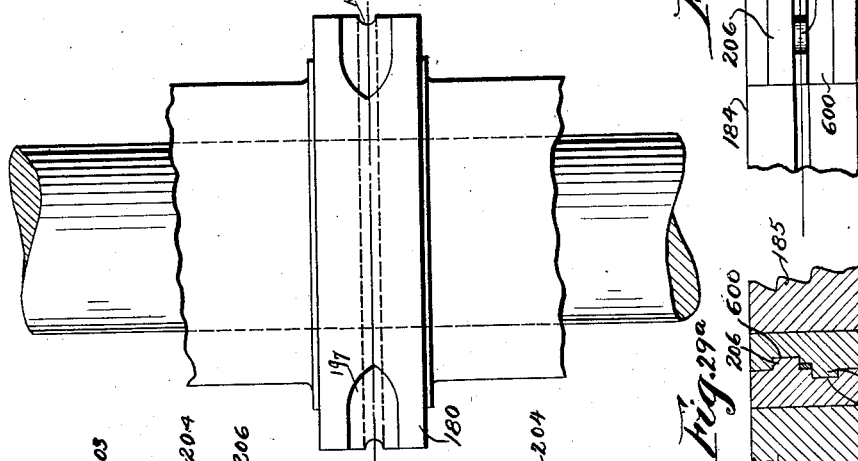
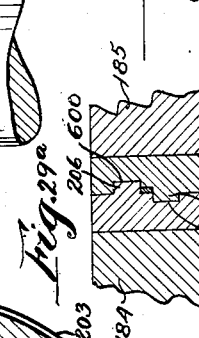
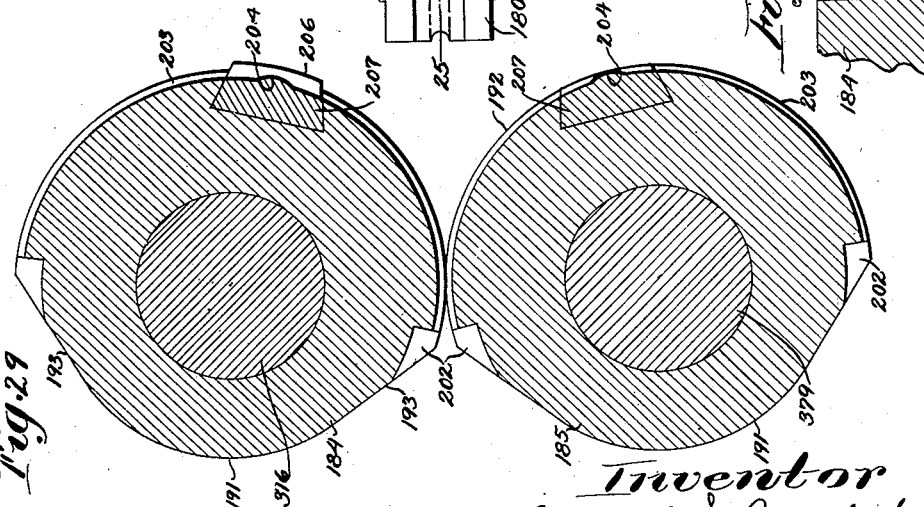
Inventor
Edward I. Braddock
by Jas. H. Churchill Atty.

March 30, 1926.                                                                1,579,071
                              E. I. BRADDOCK
          METHOD OF AND APPARATUS FOR MAKING WIRE NAILS AND LIKE ARTICLES
                         Filed April 25, 1921      19 Sheets-Sheet 12
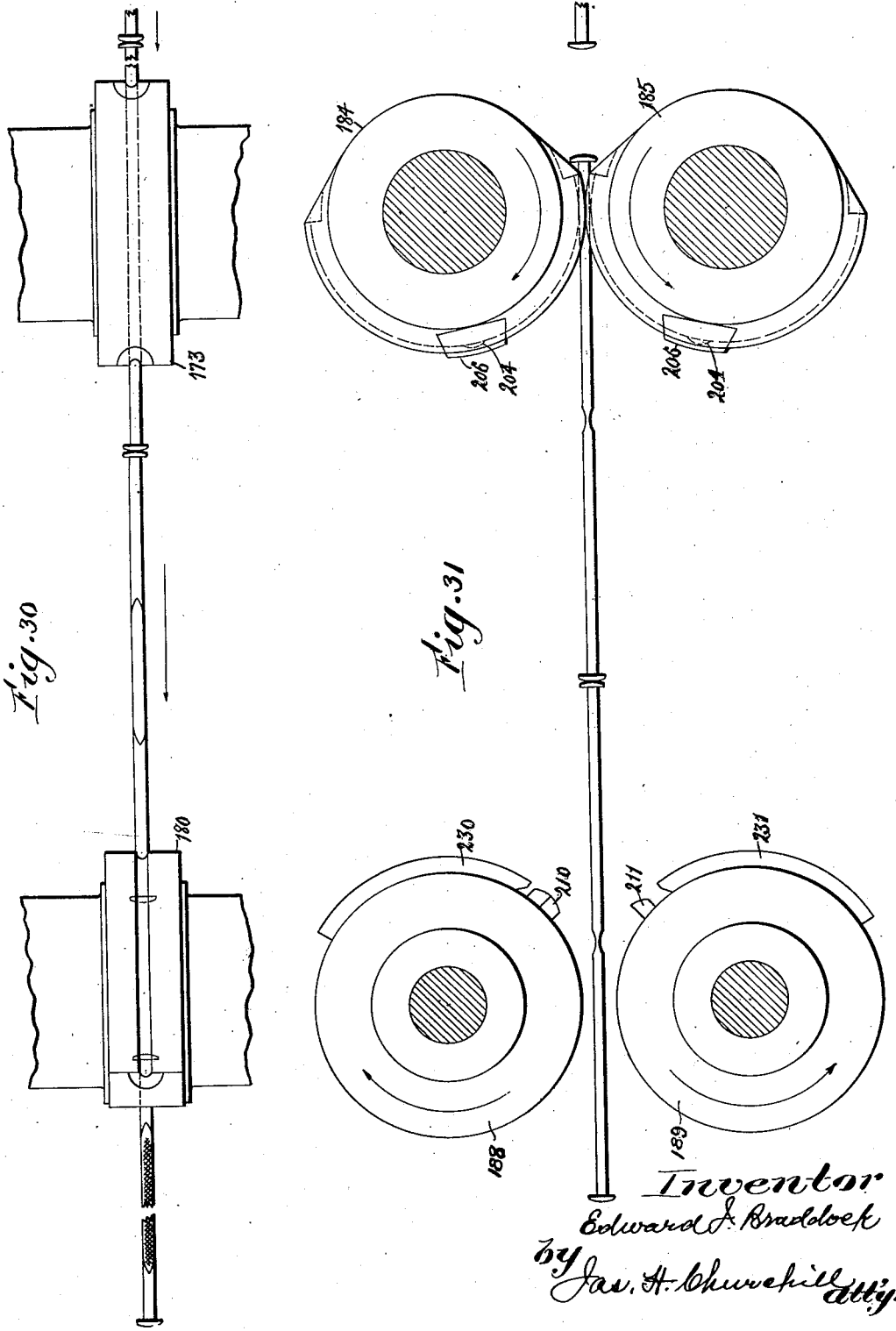

March 30, 1926.  
E. I. BRADDOCK  
1,579,071  
METHOD OF AND APPARATUS FOR MAKING WIRE NAILS AND LIKE ARTICLES  
Filed April 25, 1921 19 Sheets-Sheet 13
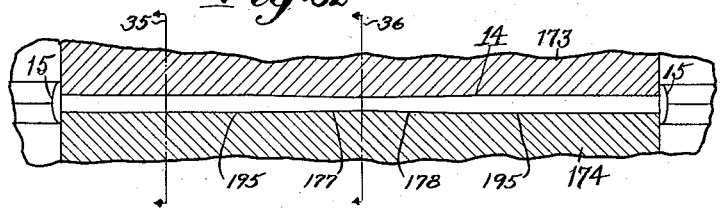
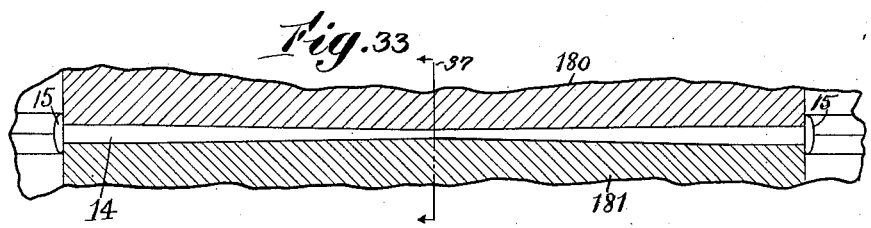
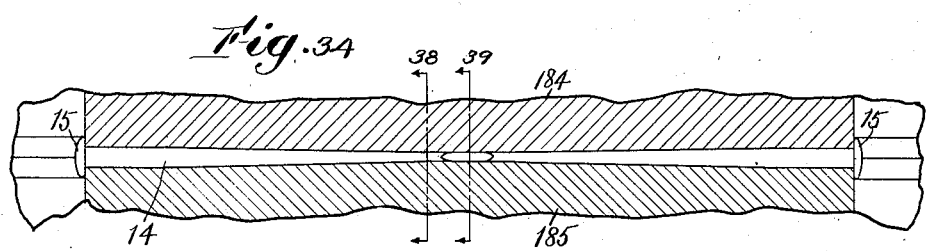
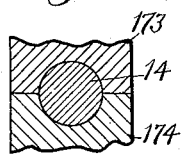 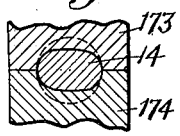 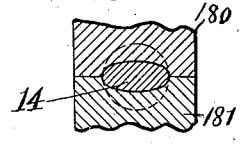
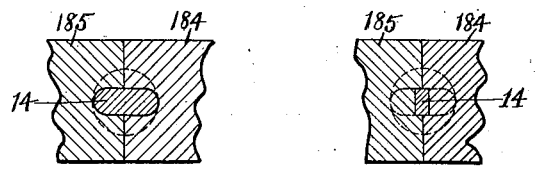
Inventor:
Edward I. Braddock
by Jas. H. Churchill
atty.

March 30, 1926.
E. I. BRADDOCK
1,579,071
METHOD OF AND APPARATUS FOR MAKING WIRE NAILS AND LIKE ARTICLES
Filed April 25, 1921    19 Sheets-Sheet 14
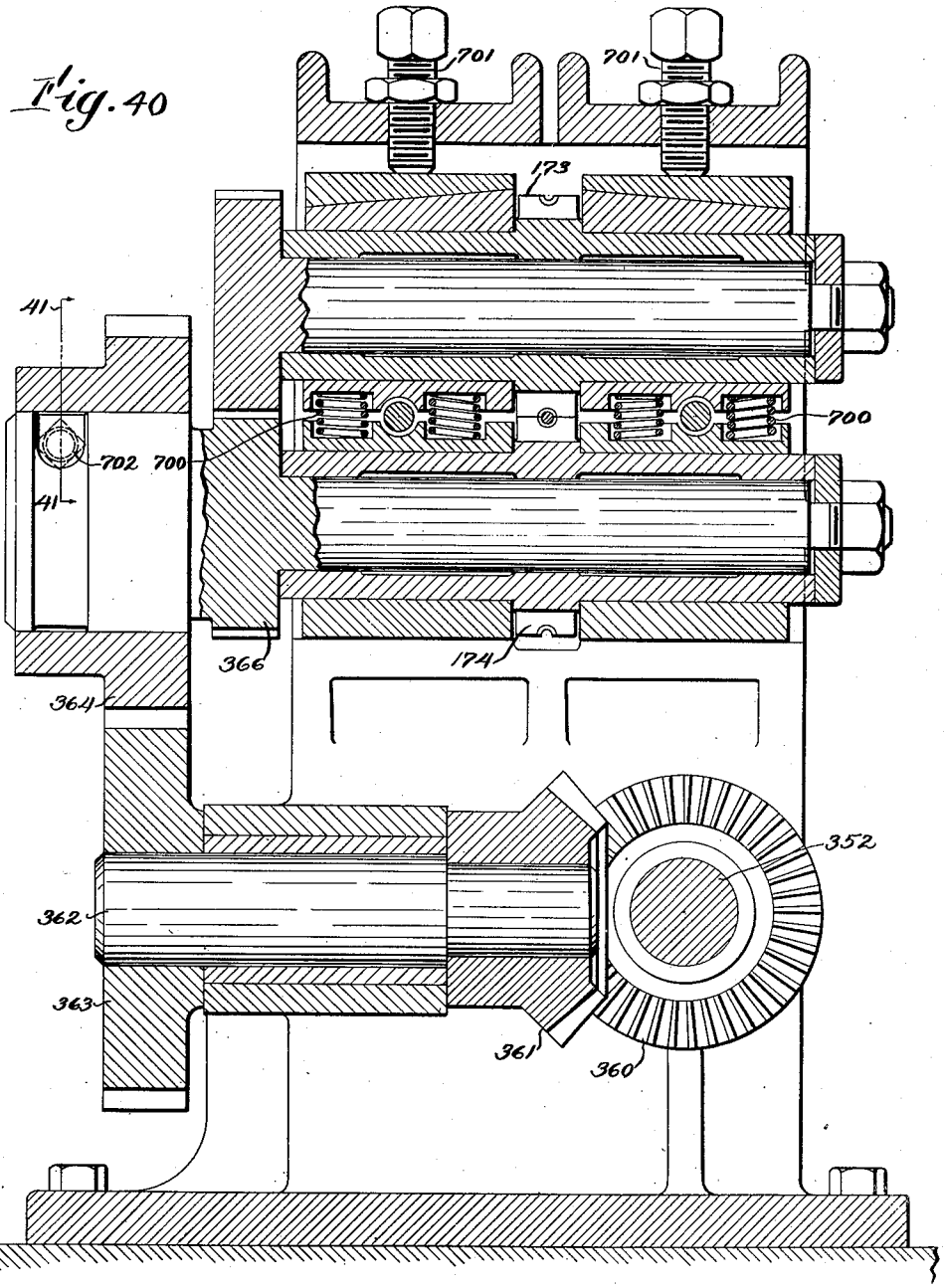
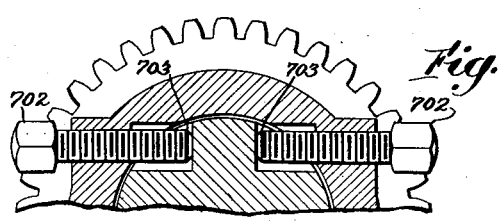
Inventor
Edward I. Braddock
by Jas. H. Churchill
atty.

March 30, 1926.
E. I. BRADDOCK
1,579,071
METHOD OF AND APPARATUS FOR MAKING WIRE NAILS AND LIKE ARTICLES
Filed April 25, 1921    19 Sheets-Sheet 15
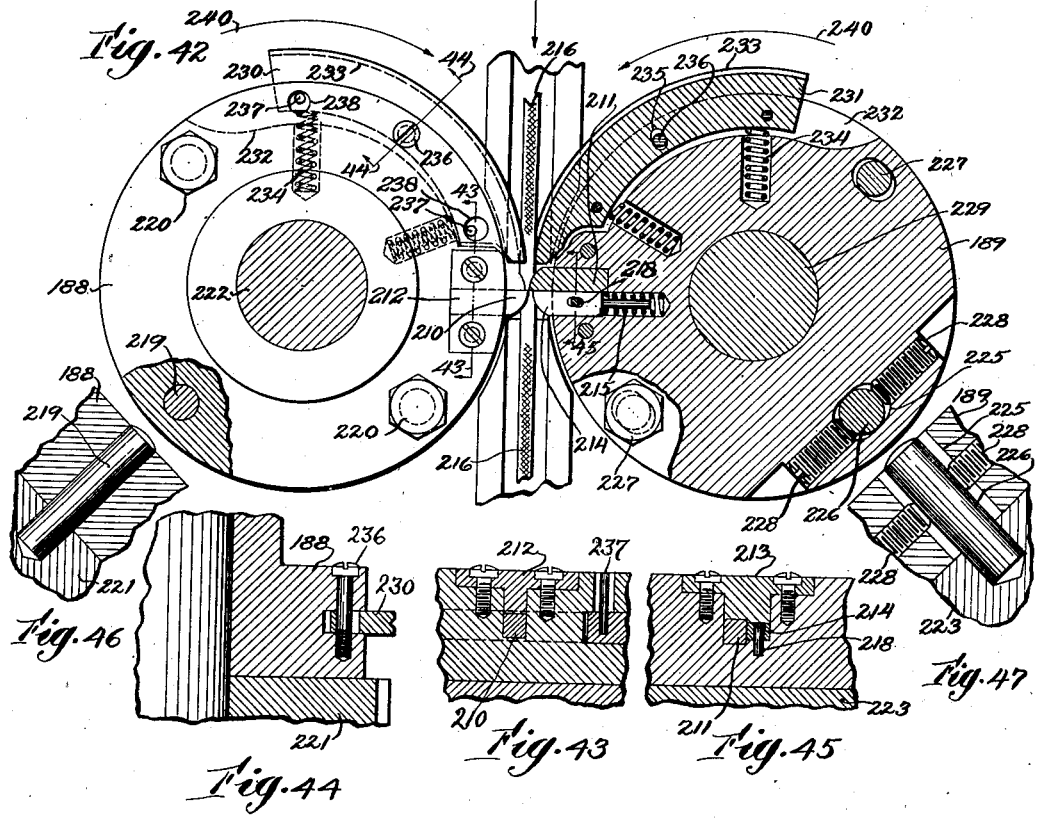
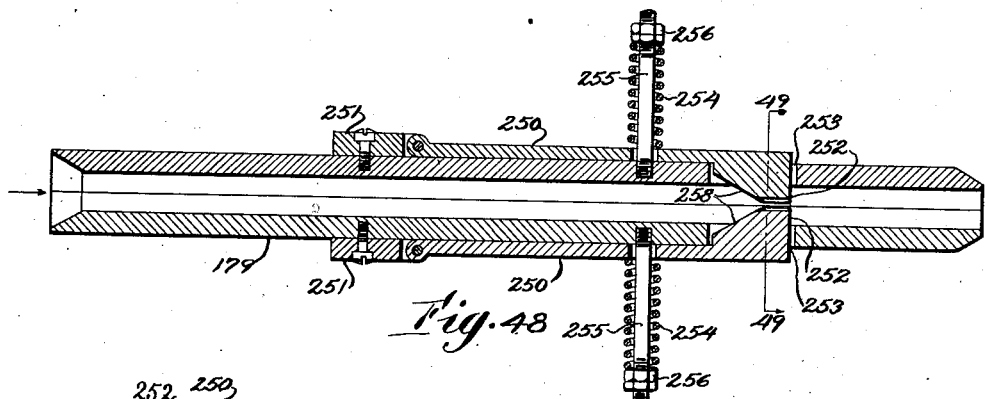
Inventor:
Edward I. Braddock
by Jas. H. Churchill,
atty.

March 30, 1926.
E. I. BRADDOCK
1,579,071
METHOD OF AND APPARATUS FOR MAKING WIRE NAILS AND LIKE ARTICLES
Filed April 25, 1921  19 Sheets-Sheet 16
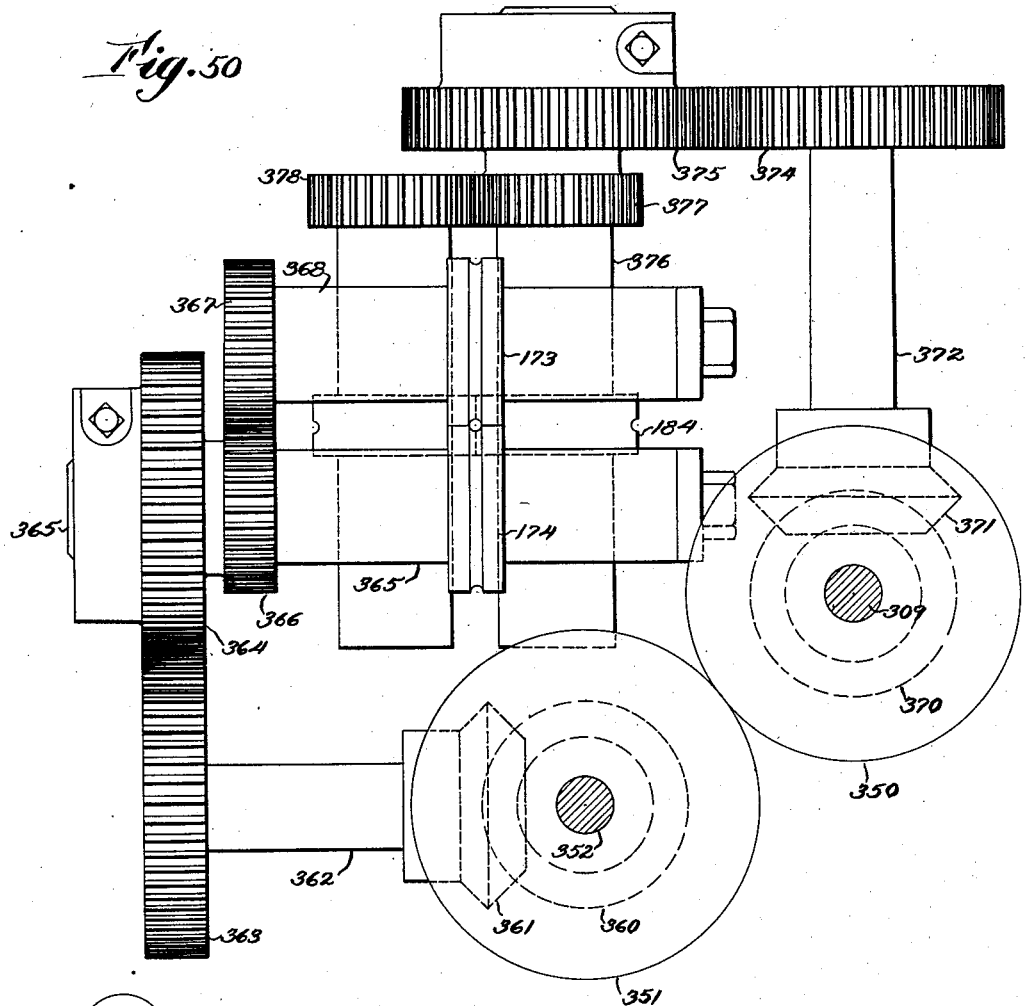
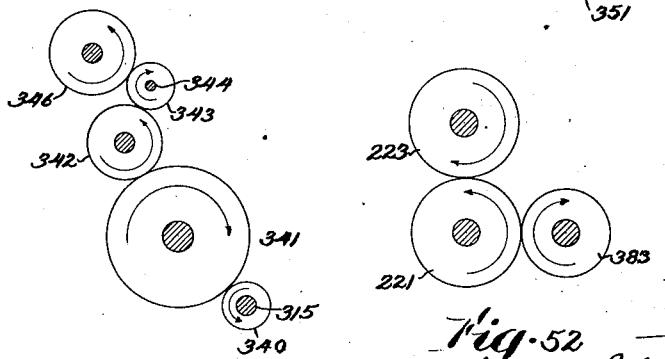
Inventor:
Edward I. Braddock
by Jas. H. Churchill
atty.

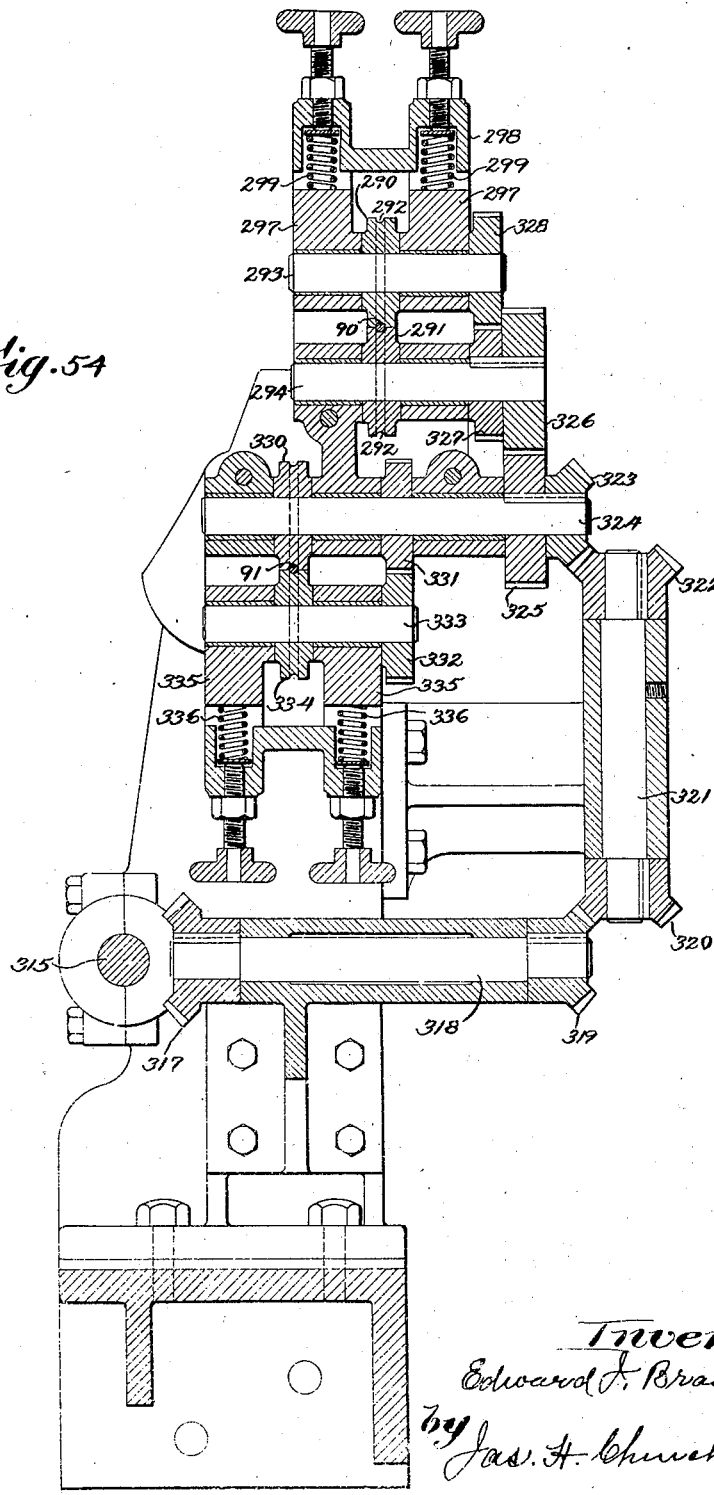

March 30, 1926.  
E. I. BRADDOCK  
1,579,071  
METHOD OF AND APPARATUS FOR MAKING WIRE NAILS AND LIKE ARTICLES  
Filed April 25, 1921    19 Sheets-Sheet 18
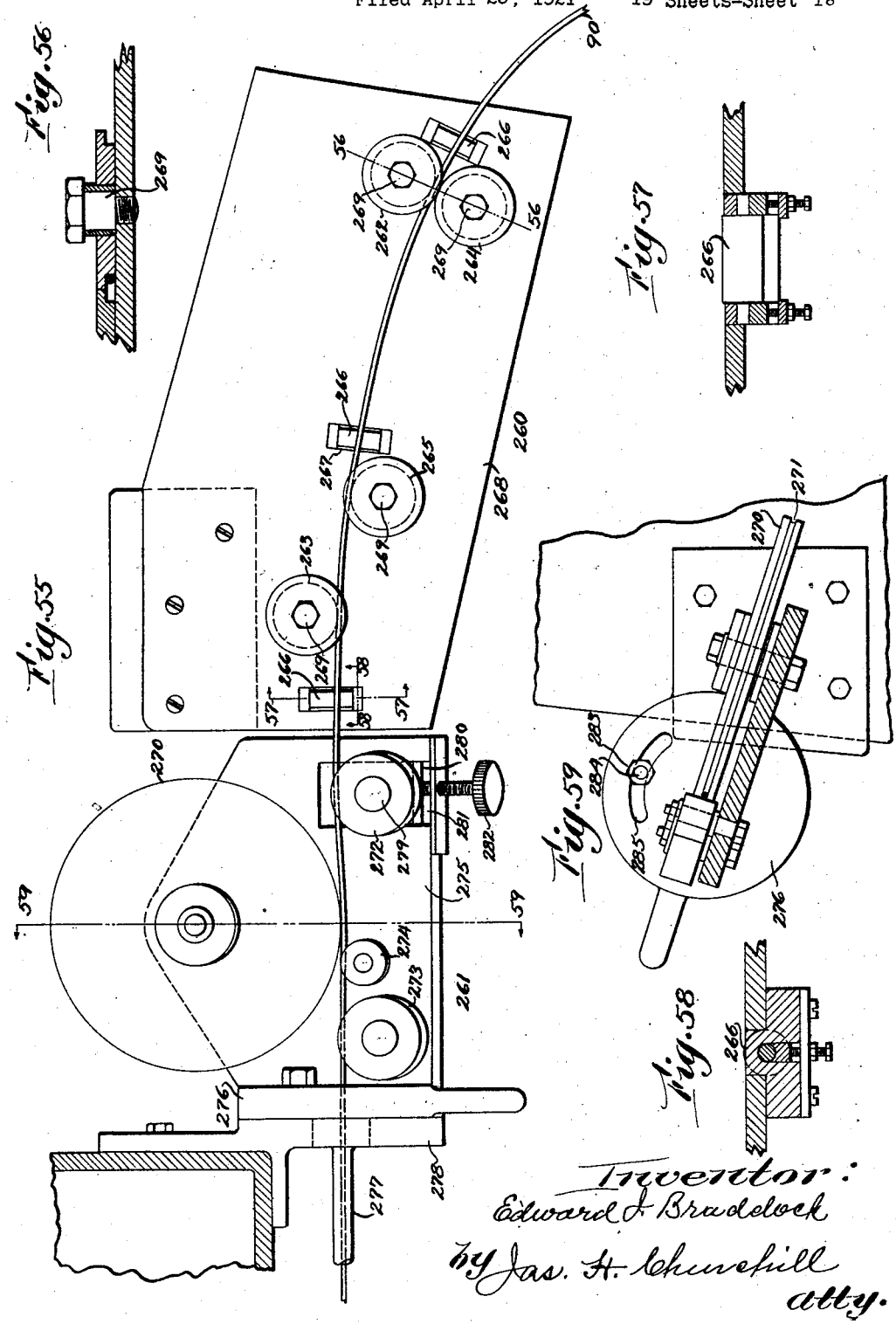
Inventor:  
Edward I. Braddock  
by Jas. H. Churchill  
atty.

March 30, 1926.  E. I. BRADDOCK  1,579,071
METHOD OF AND APPARATUS FOR MAKING WIRE NAILS AND LIKE ARTICLES
Filed April 25, 1921  19 Sheets-Sheet 19
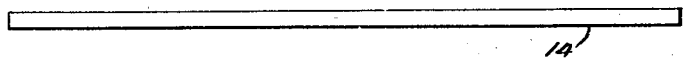
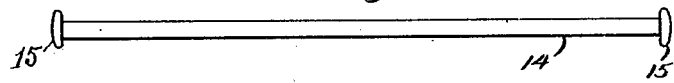
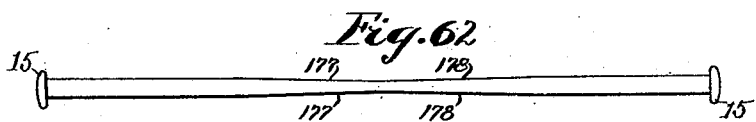
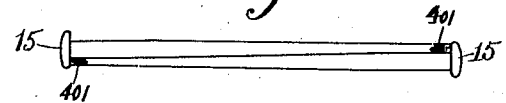
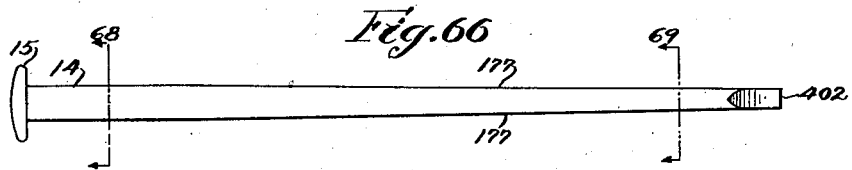
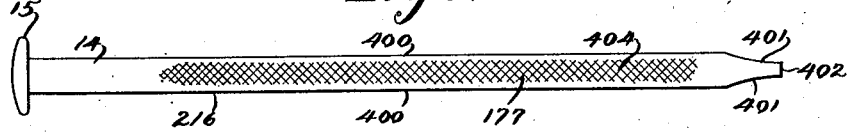
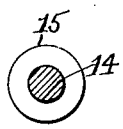
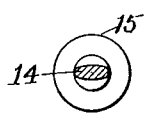
Inventor:
Edward I. Braddock
by Jas. H. Churchill
atty.

Patented Mar. 30, 1926.

1,579,071

UNITED STATES PATENT OFFICE.

EDWARD I. BRADDOCK, OF WINCHESTER, MASSACHUSETTS, ASSIGNOR TO BRADDOCK NAIL AND MANUFACTURING COMPANY, OF CLEVELAND, OHIO, A CORPORATION OF DELAWARE.

METHOD OF AND APPARATUS FOR MAKING WIRE NAILS AND LIKE ARTICLES.

Application filed April 25, 1921. Serial No. 464,249.

*To all whom it may concern:*

Be it known that I, EDWARD I. BRADDOCK, a citizen of the United States, residing in Winchester, in the county of Middlesex and State of Massachusetts, have invented an Improvement in Methods of and Apparatus for Making Wire Nails and like Articles, of which the following description, in connection with the accompanying drawings, is a specification, like characters on the drawings representing like parts.

This invention relates to the manufacture of malleable metal articles and has for its object the conversion of metal stock into duplicate finished products rapidly and economically. Particularly, the invention is addressed to the manufacture of nails and the like from wire or bar stock, and is herein exemplified by a machine and method for making headed, tapered and pointed wire nails. Thus, in its general aspects the invention consists of a method and machine for making duplicate malleable metal objects of whatever character and specific description, provided they are susceptible of fabrication by continuous roll-forging methods and mechanism, operating on metal stock or metal blanks; and in its specific aspect consists of a method and machine for automatically fabricating nails.

For illustration, the metal blank may be a wire blank and the headed articles produced therefrom may and preferably will be headed wire nails and particularly headed wire nails of novel construction, as will be described.

To facilitate description, the metal blank will be hereinafter designated a wire blank and the headed article a wire nail. In accordance with the novel method, the wire blank is compressed in the direction of its length to form heads at the opposite ends thereof, and the headed blank thus formed is elongated by rolling the desired amount, and is then severed substantially at its longitudinal center to form duplicate nails.

The elongated headed blank is preferably provided with oppositely extended tapering portions and with point forming recesses substantially at right angles to the said tapering portions between the latter, and is severed substantially at the center of said point forming recesses to form duplicate pointed nails of novel construction, as will be described.

A preferred construction of novel apparatus will be hereinafter described, with which the novel nails may be produced in accordance with the novel method referred to.

The preferred form of apparatus herein shown is provided with mechanism for straightening the wire as it comes from a coil of wire; with mechanism for feeding the straightened wire to mechanism for cutting the wire into wire blanks; with mechanism for transferring the wire blank to mechanism by which it is firmly held while it is being headed at its opposite ends; with mechanism for delivering the headed wire blanks into a runway, through which they are fed to mechanism by which they are elongated, tapered in opposite directions, compressed to further elongate them and provide them with point-forming recesses; and severed to form duplicate tapered and pointed wire nails.

These and other features of this invention will be pointed out in the claims at the end of this specification.

Fig. 1 is a front elevation of the preferred apparatus, with parts omitted, and showing the wire straightener, the wire feed, and parts of the wire holding and heading mechanism.

Fig. 2, a rear elevation of the apparatus with parts shown in Fig. 1 omitted, and showing the runway, the feed for the headed blanks and the elongating, tapering and cutting mechanisms.

Fig. 3, a vertical section on the line 3, Fig. 1, with parts omitted to avoid confusion. Fig. 3ᴬ, a detail to be referred to.

Fig. 4, a central longitudinal vertical section on the line 4—4, Fig. 3.

Fig. 5, a detail to be referred to.

Fig. 6, a detail on an enlarged scale of the blank cutting and transfer mechanism.

Figs. 7, 8 and 9, details of parts shown in Fig. 6.

Fig. 10, a detail on an enlarged scale illustrating in front elevation one of the movable gripping jaws shown in Fig. 3.

Fig. 11, a side elevation of the gripping jaw shown in Fig. 10.

Figs. 12, 13, 14 and 15, enlarged details of the movable gripping jaw shown in Figs. 10 and 11, Fig. 14 being a section on the line 14, Fig. 12.

Figs. 16, 17, 18 and 19, enlarged details of the movable stationary jaws shown in Fig. 3, to illustrate the operation of the strippers for the headed wire blank, Fig. 18 being a section on the line 18, Fig. 16.

Figs. 20, 21 and 22, enlarged details of the mechanism for delivering the headed wire blank into the runway.

Fig. 23, a detail in plan of parts shown in Figs. 20 to 22.

Figs. 24 and 25, enlarged vertical sections of the two sets of tapering rolls shown in Fig. 2, the section being taken on line 24—25, Figs. 27—28.

Fig. 26, an elevation of one of the point-forming rolls.

Figs. 27 and 28, plan views of the tapering rolls shown in Figs. 24, 25.

Fig. 29, a horizontal section through the point-forming rolls, the section being taken on line 29, Fig. 26.

Figs. 29ª and 29ᵇ, details of the point-forming rolls to be referred to.

Figs. 30 and 31, diagrammatic views to be read together and illustrating the progress of the headed blank, through the tapering, point-forming and cutting rolls.

Figs. 32 to 39 inclusive, details illustrating the action of the tapering and point-forming rolls, Figs. 35 and 36, being sections on the lines 35—36, Fig. 32, Fig. 37, a section on line 37, Fig. 33, and Figs. 38 and 39, sections on the lines 38—39, Fig. 34.

Fig. 40, an enlarged vertical section on line 40, Fig. 2, to illustrate the construction and drive of the tapering rolls.

Fig. 41, a detail in section on line 41, Fig. 40.

Fig. 42, an enlarged detail of the blank cutting mechanism.

Figs. 43, 44, 45, sectional details on lines 43—44—45, Fig. 42.

Figs. 46 and 47, details of parts shown in Fig. 42.

Fig. 48, a section of a portion of the runway shown in Fig. 2.

Fig. 49, a section on line 49, Fig. 48.

Fig. 50, a view to illustrate the drive of the tapering and point-forming rolls.

Figs. 51, 52 and 53, diagrams to illustrate drives to be referred to.

Fig. 54, an enlarged vertical section of the wire feed mechanism, taken on line 54, Fig. 1.

Figs. 55 to 57 inclusive, details illustrating the wire straightening mechanism shown in Fig. 1, Figs. 56, 57, 58 and 59 being sections on lines 56—57—58—59 respectively on Fig. 55.

Fig. 60 represents the wire blank cut from the continuous wire.

Fig. 61 represents the wire blank headed.

Fig. 62 represents the headed blank after passing through the first set of tapering rolls.

Fig. 63 represents the blank shown in Fig. 62 after passing through the second set of tapering rolls.

Fig. 64 represents the blank shown in Fig. 63 after passing through the point-forming rolls.

Fig. 65 represents duplicate wire nails formed by cutting the blank shown in Fig. 64 and nested together.

Fig. 66 represents a side view on a larger scale of one of the nails.

Fig. 67 represents a plan view of the nail shown in Fig. 66, and

Figure 10:
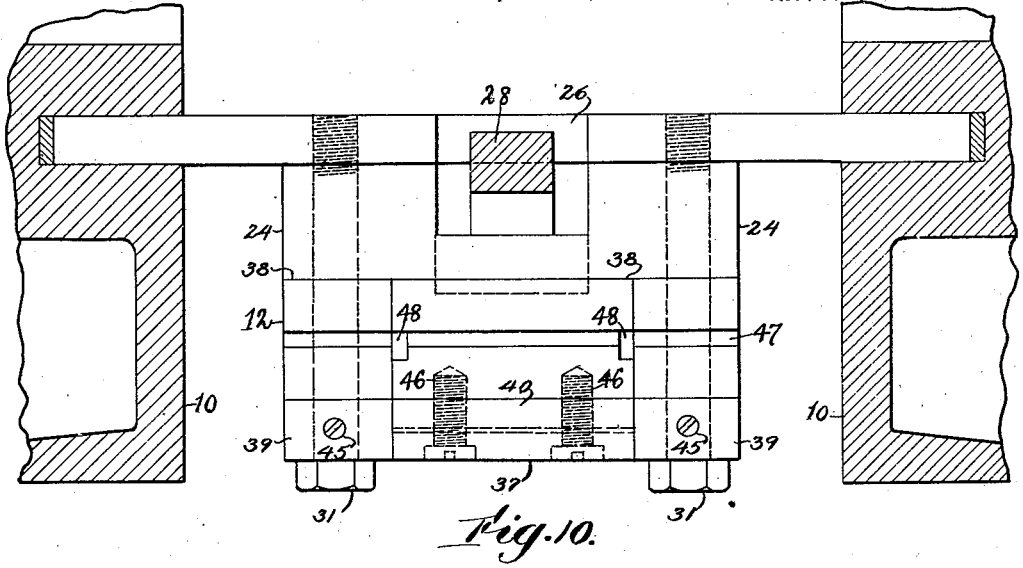

Figs. 68 and 69, sections on the lines 68—69, Fig. 66, respectively.

In the machine or apparatus herein shown, provision is made for heading wire blanks rapidly, and to this end the jaws which grip the wire blanks and the devices for heading the wire blanks are mounted so as to be rotated at a relatively high speed and this portion of the machine will be hereinafter designated the rotor and will now be described.

Referring to Figs. 1 to 4, 10, 10 represent two like supporting members for a plurality of sets of gripping jaws 12, 13 herein shown as four in number, see Fig. 3, and lettered $a$, $b$, $c$ and $d$. Each set of jaws 12, 13 grips a wire blank 14, see Fig. 60, and holds it firmly, while the opposite ends of the wire blank are compressed in the direction of its length to provide the wire blank with heads 15 at its opposite ends, see Fig. 61.

The supporting members 10 are mounted to turn on a stationary shaft 16, which is secured to side frames or uprights 17, 18. The supporting members 10—10 are spaced apart on the stationary shaft 16 and are driven, as will be described, so as to rotate in unison.

Each supporting member 10 is provided on its inner surface with preferably a plurality of grooves or channels 21, in which are inserted carriers for the gripping jaws 12, 13. In the present instance each supporting member 10 is provided with four grooves or channels 21 which are arranged at right angles or in the form of a square so that four sets $a$, $b$, $c$, $d$ of gripping jaws are mounted on the rotatable support or frame of the rotor and are arranged in pairs, see Fig. 3, so that two sets of jaws, as

*d, c*, arranged diametrically opposite, may receive wire blanks 14 from one source of supply, and the other two sets of jaws, as *a, b*, which are arranged substantially at right angles to the first two sets of jaws, may receive wire blanks 14 from another source of supply.

Each set of jaws comprises a movable jaw 12 and a stationary jaw 13, and the former is mounted on a movable carrier, which slides in one set of the grooves or channels 21.

Inasmuch as the construction and arrangement of each set of gripping jaws is the same, a detailed description of one will suffice for a clear understanding of all.

Figure 11:
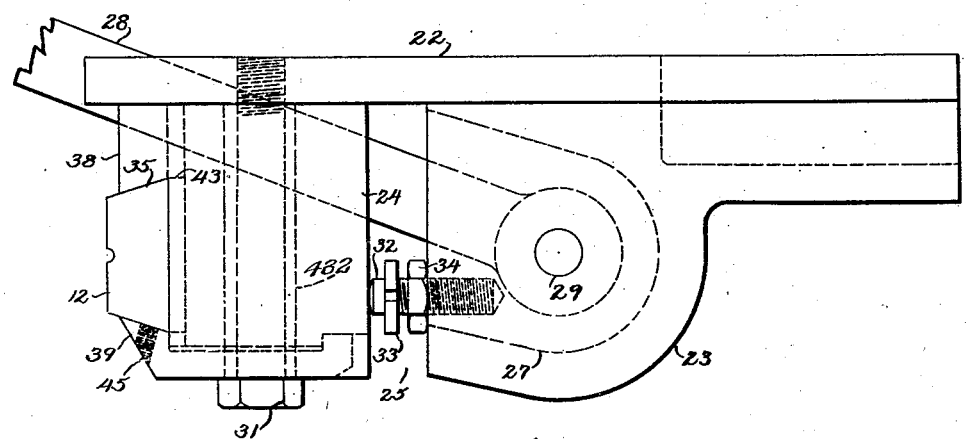

The carrier for the movable jaw 12 is preferably made as hereinshown, see Figs. 3, 10 and 11, and consists of a top plate 22, a depending boss 23, and a depending block 24 which is separated from the boss 23 by a space 25.

The top plate 22 is provided with a substantially central slot 26, which extends from one end, toward the longitudinal center of the plate. The boss 23 is cored to form a socket 27, which is extended from the inner face of the boss and receives one end of a connecting rod 28, which is pivotally attached to the boss 23 by a pin 29. The socket 27 is located in the plane through the slot 26 in the top plate 22, and in this plane is located a slot 30 in the portion of the block 24 adjacent the top plate 22, the slot 30 having its bottom wall inclined downward from its front face toward the boss 23, for the passage of the connecting rod 28, see Figs. 3 and 14.

The block 24 constitutes the holder proper for the movable gripping jaw 12, and is fastened to the top plate 22 by bolts or screws 31, see Figs. 3, 10 and 11, which extend through elongated slots 432 in the block 24, to permit adjustment of the movable gripping jaw 12 toward the stationary gripping jaw 13. The block 24 may be adjusted on the plate 22 by bolts or threaded rods 32, see Figs. 3, 11 and 12, having one end extended into threaded holes in the face of the boss 23 on opposite sides of the socket 27, and said bolts are provided with fixed heads 33 and with lock nuts 34. The block 24 is provided at its front face with a dovetailed slot 35, see Fig. 11, which extends parallel with the top plate for the full width of the block, and said block is provided on its under side with a slot 36, see Fig. 13, which extends parallel with the top plate 22 but at right angles to the dovetailed slot 35 and intersects the latter. The slot 36 is designed to receive a cap plate 37 and for convenience may be designated the cap slot, whereas the slot 35 may be designated the jaw slot.

Figure 12:
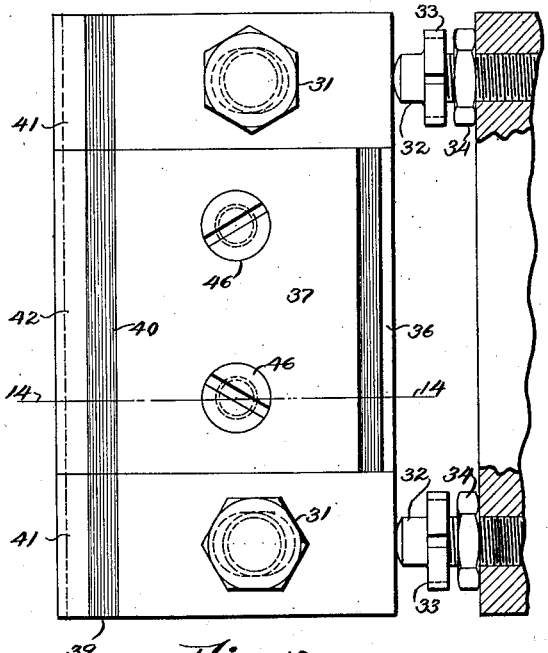
Figure 13:
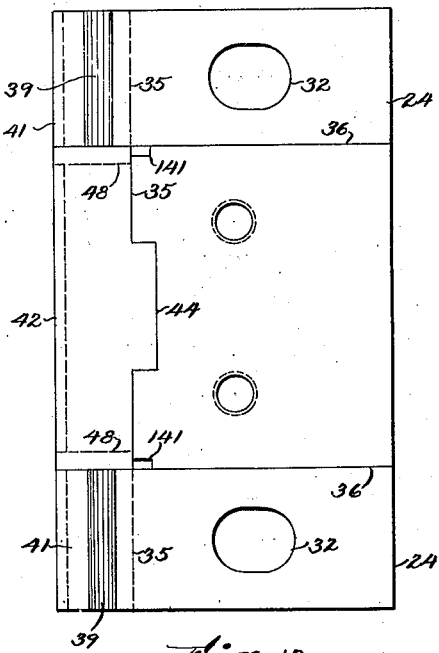
Figure 14:
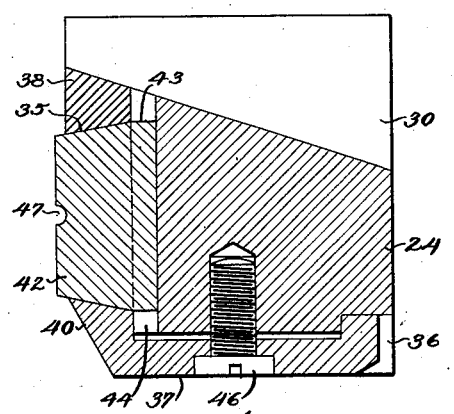

The jaw slot 35 is provided with a continuous upper wall 38, and with a lower wall composed of two end portions 39 which are attached to the block 24 and an intermediate portion 40 which is attached to the cap plate 37, see Figs. 10, 12 and 14.

Figure 15:
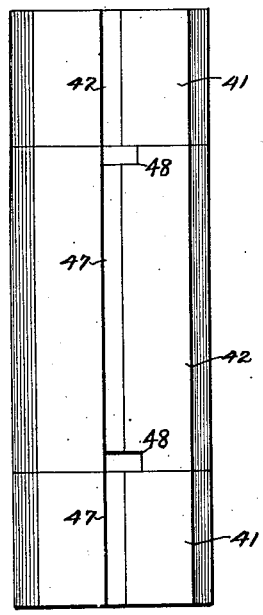

The jaw 12 is preferably made in three pieces or sections, see Fig. 15, to wit, end sections 41 of substantially the same width as the portions 39 of the lower wall of the jaw slot, and an intermediate section 42 of substantially the width of the cap slot 36. When the cap plate 37 is removed from the block 24, the intermediate jaw section 42 is capable of being inserted into and removed from the jaw slot 35 through the space between the end portions 39 of the lower wall of the said jaw slot, and said section is guided in its movement by a tongue or projection 43 on its rear surface, see Fig. 14, which is movable in a slot or way 44 in the rear wall of the jaw slot 35, see Fig. 13. When the intermediate section 42 of the jaw 12 is inserted into place, with its tongue 43 in the slot 44 and its beveled upper surface in contact with the continuous upper wall 38 of the jaw slot 35, it is retained in position by the cap plate 37, which is secured to the lower face of the block 24 with the beveled section 40 in contact with the beveled lower surface of the intermediate jaw section 42, see Figs. 10 and 14. The tongue 43 fits the slot 44 snugly and serves to not only guide the jaw section 42 into place but also to prevent twisting or turning movement of the section 42 with relation to the end sections 41, which are inserted into the jaw slot 35 from the opposite ends of said slot. The end sections 41 of the movable jaw are secured in place by a tight fit assisted by screws 45 inserted through the end portions 39 of the bottom wall of the jaw slot 35, see Fig. 10. The cap plate 37 is secured to the block 24 by screws 46, see Figs. 10, 12 and 14.

The movable gripping jaw 12 is provided on its front face with a groove 47 for the reception of the wire blank 14, and the intermediate section 42 of said jaw is provided on its opposite sides with slots 48, which extend from the front to the rear faces of the jaw substantially at right angles to the groove 47, see Figs. 16 to 19, and receive stripping devices 49—50, one of which serves to remove the wire blank 14 from the groove 47, as will be described. The movable jaw 12 cooperates with the stationary jaw 13 of like construction, and the side slots 48 in the intermediate section of the stationary jaw are aligned with the side slots 48 in the intermediate section of the movable jaw to form continuous slots, see Fig. 19. The intermediate section 42 of the stationary jaw 13 is secured by its cap plate 37 to a block 51, see Fig. 3, which may be integral with a top plate 22 which is secured in any suitable manner in a fixed position in the grooves 21 and is provided with an opening or socket 53 across which is extended a pivot pin 54 for a cam lever 55 to which the connecting rod 28 is pivotally connected by the pin 56, see Fig. 3.

The block 51 and plate 52 constitute the carrier for the stationary jaw 13, and the block 51 has attached to it at its front end on opposite sides of the jaw, lifting devices 57 for the wire blank, which operate in a manner as will be hereinafter described. The cam lever 55 is oscillated on its pivot 54 preferably by three stationary cams, as hereinshown. One of the cams is shown as a peripheral cam 58, see Figs. 3 and 4, which is secured to the stationary shaft 16 by a key 59, and the other two cams are disk cams 60 also keyed to the shaft 16 and located on opposite sides of the peripheral cam 58 and provided with cam grooves 61 in their adjacent faces. The cam grooves 61 are shaped the same as the periphery cam 58 and have cooperating with them rolls 62 on the ends of a pin or shaft 63 carried by forks 64 at the free end of the lever 55, and the peripheral cam has cooperating with it a relatively large roll 65 which is mounted on the pin 63 between the forks 64, see Fig. 4.

The cams 58, 61 are suitably shaped to effect the following cycle of operations on each rotation of the rotor, to wit, to open the movable jaw 12 and hold it open while a wire blank 14 is being inserted between the jaws; to close the movable jaw 12 and cause it to firmly grip the wire blank 14 between it and the fixed jaw 13, while the said blank is being headed; to open the movable jaw 12 and permit the headed blank to be transferred to a delivery mechanism which delivers the headed blank to a trough or runway through which it is fed to the elongating and tapering mechanism, to be described. The rotor members 10 carry devices for compressing the ends of the wire blank, which project beyond the sides of the gripping jaws 12, 13, so as to form the heads 15 on said wire blank.

These compressing devices will be hereinafter termed headers and as they are alike, a detailed description of one will suffice. Each header consists of a hardened steel piece or die 70, see Fig. 4, having a threaded rear portion extended into a threaded socket 71 in a holder, herein shown as a cylindrical rod 72 attached to a block or frame 73 mounted on the rotor member 10 to rotate therewith and to slide axially thereon. The holder 72 reciprocates in a bushing 74 carried by the rotor member, and the sliding frame 73 carries a roller 75 which cooperates with a stationary cam ring 76, to move the header toward the gripping jaws, and also carries a roller 77 which cooperates with a stationary cam 78 to move the header away from the gripping jaws.

The stationary cam rings 76—78 are secured to the stationary framework of the machine, and the cams thereon are properly shaped and timed to perform their functions. The cam surfaces on the cam rings 76 which actuate the headers are arranged so as to move the heading dies 70 toward the gripping jaws and engage the opposite ends of the wire blank 14 after the latter has been centered transversely on the stationary gripping jaw 13, and to center the wire blank longitudinally with relation to the stationary gripping jaw 13 before the movable gripping jaw 12 is closed upon the wire blank. As a result, the portions of the wire blank which project beyond the opposite sides of the gripping jaws are of equal length and the heads 15 formed therefrom are of equal diameter and thickness and of uniform strength. At or about the time the wire blank 14 is centered longitudinally on the stationary gripping jaw 13, the movable gripping jaw 12 is closed to firmly grip the wire blank for the entire length of the portion between the said jaws, and while thus firmly held, the rotor advances and moves the headers 70 with relation to their cooperating stationary cams 76, thereby bringing the latter into action to gradually compress the projecting ends of the wire blank against the sides of the gripping jaws, and thereby form the heads 15 on the wire blank.

After the heads 15 are thus formed, the headers 70 are withdrawn by the cams 78 assisted by springs 133, see Fig. 4, and the headed wire blank is firmly held between the gripping jaws. The rotor members 10 also carry mechanism for engaging the headed blank after the heading dies have been withdrawn, and while the headed blank is held by the gripping jaws. The mechanism referred to serves to hold the headed wire blank firmly when it is released by the gripping jaws, and to remove the headed blank from said jaws and transfer it to means for delivering the headed blank out of the rotor, as will be described.

The transfer mechanism referred to consists, as herein shown, of two spring metal arms 80, see Fig. 4, each of which is fastened as by a bolt 81 to a rocker arm 82, mounted to turn on a pivot pin 83 carried by a rotor member 10. The rocker arms 82 enable the spring arms 80 to be moved radially outward to position them with respect to the headed wire blank, so that the heads of the latter may enter grooves 85 in the inner faces of the spring arms, see Figs. 4 and 5, and be frictionally engaged with the latter so as to be held thereby and thus permit the gripping jaws 12, 13 to be opened. The spring arms 80 are actuated by cam grooves 86 in the disks 87 keyed to the stationary shaft 16 of the rotor, said grooves having extended into them rollers 88 mounted on pins 89 carried by the spring arms 80.

After the headed wire blank has been engaged by the transfer mechanism the movable gripping jaw 12 is opened by its cams 58, 61 and the strippers 49, 50 are brought into action to remove the headed wire blank from the grooves 47 in the gripping jaws 12, 13. The action of the strippers 49, 50 may be readily followed by referring to Figs. 16 and 17.

Figure 16:
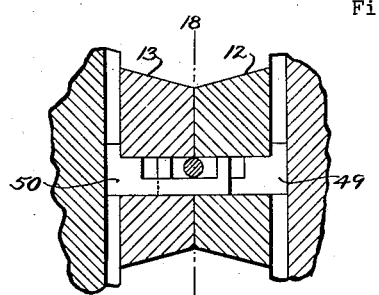

In Fig. 16, the gripping jaws 12, 13 are shown in their closed position above referred to, and when the movable gripping jaw 12 is opened, it carries with it the strippers 49 and causes their fingers 135, which are in the slots 48 in the stationary jaw 13, to engage the wire blank 14 and remove it from the groove 47 in the stationary jaw. On the further opening movement of the movable jaw 12, the latter moves away from the strippers 50 carried by the stationary jaw, and brings the wire blank 14 into engagement with the fingers 136 on the strippers 50, which fingers prevent further movement of the wire blank with the movable jaw 12, which latter on its further opening movement carries its grooved face away from the wire blank 14 and the latter is thus positioned between the fingers 135, 136 of the strippers clear of both jaws, see Fig. 17. By reference to Figs. 16 and 19, it will be seen that the strippers 50 carried by the stationary jaw 13 are fixed at their ends to said jaw by the lugs 138 engaging the rear wall of said jaw, and that the strippers 49 carried by the movable gripping jaw 12 are fixed at their rear ends in a like manner by the lugs 139. The rear ends of the strippers which project beyond the rear faces of the gripping jaws are extended into suitable slots 140, 141 in the blocks 24, 51 to which said jaws are secured.

The action of the strippers 49, 50 on the headed wire blank 14 takes place while the headed blank is frictionally held by the spring arms 80, and the headed blank is now removed from between the open gripping jaws by the cam grooves 86, which are suitably shaped and timed to move the spring arms and carry the headed blank outwardly and clear of the gripping jaws 12, 13 and the lifting fingers 57, and into position to enable the headed wire blank to be engaged with means by which it is removed from the transfer mechanism and therefore from the rotor and delivered into a trough or runway 142, see Fig. 2, leading to the mechanism by which the headed blank 14 is elongated, and severed, as will be described.

In the present instance, the rotor cooperates with separate mechanisms for forming the wire blanks 14 from two continuous lengths of wire 90, 91, see Fig. 1. Each of the separate blank forming mechanisms comprises a feed mechanism and a cutting mechanism for each of the wires 90, 91, and may be designated the upper and lower blank forming mechanisms for the upper and lower wires 90, 91. Inasmuch as these blank forming mechanisms are of like construction, a detailed description of one, to wit, the upper one, will suffice for both.

The upper blank forming mechanism hereinshown, see Fig. 6, consists of a cutter or knife 92 mounted in a cutter carrier 93, fast on a shaft 94 journaled in uprights 95, 96, see Fig. 6, which form part of the framework of the machine.

The cutter 92 is inserted into a suitable guideway in the carrier 93 and is provided at its rear end with a slot 97 which permits the cutter to straddle a pin 98 carried by the cutter carrier 93, see Fig. 6.

The upper face of the cutter 92 is straight and provided with a groove 99 for the reception of the wire 90 from which the blank 14 is to be formed. The cutter carrier 93 is mounted on the shaft 94 in proximity to the upright 95, which has attached to its inner surface, as by screws 100, a disk 101 which is provided with an opening for the reception of a stationary cutter in the form of a bushing 102, having a central bore or opening of the diameter of the wire 90. The cutter 102 is held stationary by the screw 103. Provision is made for supporting the free end of the wire 90 while it is being cut by the cutters 92, 102.

To this end, the shaft 94 has fast on it near the upright 96 a crank or arm 104, shown in Fig. 7, which revolves in close proximity to a disk 105, see Fig. 1, which is like the disk 101 and is secured to the upright 96. The crank or arm 104 is substantially parallel with the cutter carrier 93 and has a straight surface 106, and is mounted on the shaft 94 so that its surface 106 is in substantially the same axial plane as the cutting surface of the cutter 92. As a result of this arrangement, the free end of the wire abuts against the disk 105 and rests upon the surface 106 of the crank 104 and is supported thereby while the wire is being cut by the cutter 92.

The wire blank 14 thus formed is free from the continuous wire 90 and is supported at one end by the cutter 92 and at its opposite end by the crank or arm 104. The wire blank 14 is next transferred to a set of the gripping jaws 12, 13.

To this end, the wire blank 14 is carried by the cutter 92 and by the crank 104 on the shaft 94 upwardly and into a pathway 107, see Fig. 6, which is formed by a substantially wide lower stationary arm 108 and an upper stationary arm or block 109 depending from a cross bar 110 connecting the uprights 95, 96. The lower arm 108 is attached to a cross bar 112, which is secured to the uprights 95, 96, and the arms 108, 109 are curved rearwardly toward the rotor. The lower arm 108 projects beyond the sides of the upper arm, 109 and forms a support for the free ends of presser fingers 113, which are loosely mounted on a rock shaft 114 journaled in the uprights 95, 96, and said fingers are normally extended across the pathway 107 and bear upon the projecting sides of the lower arm 108, being normally held in contact therewith by springs 115 connected to the presser fingers and to the cross bar 110. The rock shaft 114 has fast on it beyond the presser fingers 113, knock off fingers 116, having upright members 117, which are connected by springs 118 to the cross bar 110, and carry adjusting screws 119, which cooperate with lugs 120 extended from the sides of the upper arm 109 to properly position the knock off fingers with relation to the pathway 107.

The stationary arms or guides 108, 109 are arranged between the uprights 95, 96, and are separated therefrom sufficient distances to permit the presser fingers 113 to be located between them and the uprights, so that said presser fingers may bear down upon the end portions of the wire blank 14 which extend through and beyond the pathway 107. It will be understood that the wire blank 14 is carried into the pathway 107 as soon as it is cut from the continuous wire 90, and in order to prevent imperfect blanks from being transferred to the rotor, provision is made for rejecting the imperfect blanks, that is, blanks which are of such short length as not to be supported by the supporting crank or arm 104 cooperating with the cutter 92. The short blanks are rejected and thrown out of the machine by the knock off fingers 116, which are extended transversely of the pathway 107 in proximity to the presser fingers 113.

By reference to Fig. 6, it will be seen that when the wire blank 14 is cut off, it is immediately brought into contact with the knock off fingers 116, and if it is unsupported by the crank or arm 104, it is rejected by the knock off fingers and drops on the floor out of the way of the next blank. If, however, the wire blank 14 is supported at its opposite ends by the cutter 92 and crank 104, it turns the knock off fingers back out of the pathway 107 against the action of the springs 115, and when it has passed by the knock off fingers, it is immediately engaged with the presser fingers 113, and the knock off fingers 116 are returned by their springs 115 into their operative position, shown in Fig. 6. The wire blank 14 is then forced through the pathway 107 by the rotating cutter 92 and crank 104 and is firmly held by the presser fingers 113 down on the guide arm 108, which constitutes the lower wall of the pathway 107.

The wire blank 14 is engaged by the cutter 92 and crank 104 until it reaches the outlet end of the pathway 107, see Fig. 6, whereupon it slides down upon a substantially flat portion or shoulder 122 on the upper surface of the lower guide arm 108 and against yielding stops, in the form of sheet metal spring strips 123, see Fig. 6, which are fastened at their lower ends and have their upper ends free and extended beyond the upper wall of the pathway 107 and into close proximity to cam plates 124 fastened to the inner surfaces of spring metal plates 125, which are attached at their upper ends to hubs or sleeves 126, see Fig. 1, fast on a stationary rod 127 supported in brackets 128 attached to the side uprights 17, 18 of the framework.

The spring plates 125 are designed to be engaged by the opposite ends of the wire blank 14, when the latter is lifted from the lower wall of the pathway 107, which is effected by the lifting fingers 57 attached to the stationary jaw 13 of the rotor. The lifting fingers 57 in the rotation of the rotor in the direction of the arrow 129 in Figs. 3 and 6 are brought under the wire blank 14 resting on the shoulders 122, and on the continued rotation of the rotor the wire blank 14 is carried along the upper ends of the spring members 123 and into engagement with the curved or cam surfaces 124 of the plates 125, which cam surfaces are suitably shaped to move the wire blank on the lifting fingers and toward the gripping jaws. The spring plates 125 may have attached to them stiffening pieces 130. They also have attached to them cams or guiding pieces 131 for the headed wire blank formed by the lower blank forming mechanism, see Fig. 6, and with which the spring strips 123 also cooperate, as will be described.

During the movement of the wire blank 14 toward the rotor by the cams 124, the said blank is frictionally held by the spring plates 125, which are slotted at their lower ends to straddle guide blocks 132 attached to the uprights 95, 96. Each guide block 132 is provided with a lug 133, see Fig. 8, which acts as a stop against which the lower end of the spring plate abuts.

Figure 17:
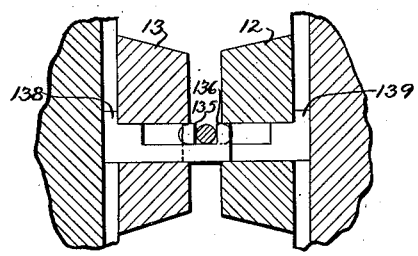
Figure 18:
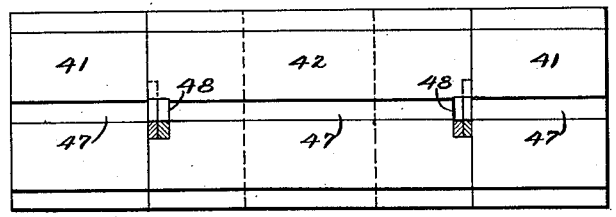
Figure 19:
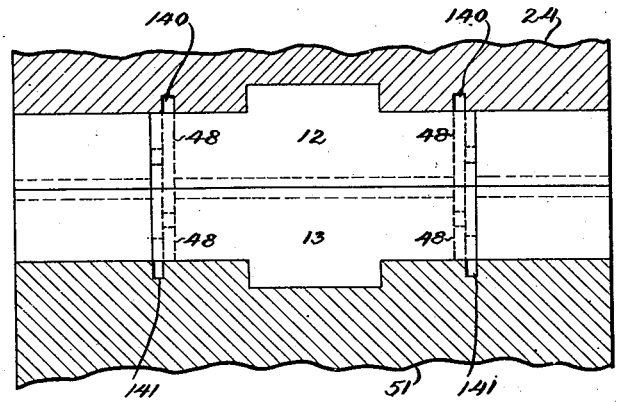

The cams 124 are suitably shaped so that they control the wire blank 14, until the latter is laid in the groove 47 in the stationary jaw 13 and against the strippers 49, 50 and is properly centered transversely of the gripping jaw 13, see Fig. 17, and said cam surfaces are terminated and cease to engage the wire blank when the latter has been transversely centered on the stationary jaw. The wire blank thus transversely centered on the stationary jaw extends longitudinally beyond the opposite sides of the stationary jaw and is carried by the rotor out of engagement with the spring plates 125 and are then engaged by the headers as above described.

The wire blank after being headed and removed from the gripping jaws by the transfer mechanism as above described, is removed from the spring arms 80 of said transfer mechanism. This is accomplished in the present instance by means of fingers 144, see Figs. 3, 20, 21 and 22, which are engaged by the headed blank as the spring arms 80 are carried past said fingers in the rotation of the rotor. The fingers 144 are extended from arms 145 cooperating with curved arms 146 to form a raceway 147. The arms 145 are spaced apart and secured to a suitable support 148 attached to the framework of the machine.

As the spring arms 80 movable with the rotor are carried past the fingers 144, the latter engage the headed wire blank 14 and restrain it from moving with the said spring arms, see Fig. 3ᴬ, which on their continued movement with the rotor release the headed blank, and permit the latter to descend into the raceway. The raceway 147 is formed by two pairs of the stationary arms 146, 147, as shown in Fig. 22, and each stationary arm 146 has pivoted to it a curved lever 149, which is normally held against a stop pin 150 by a spring 151. The levers 149 form pressers which engage the headed blank 14 and press it against the rear walls 145 of the raceway, while the said blank is being moved through the raceway. The headed wire blank is moved through the raceway by a wiper arm 152 attached to a crank 153 fast on a rotatable shaft 154, which in its rotation causes the arm 152 to push or wipe the headed wire blank 14 through the raceway into the trough 142, whose inner side wall in front of the raceway is provided with an opening to permit the headed wire blank to be carried into the trough by the revolving arm 152. The arm 152 is provided as shown with two fingers 155, which enter grooves or channels 156 in the supporting member 148 for the arms 145 for a purpose, as will be described.

Provision is made for preventing the headed wire blank deposited in the trough by the revolving arm 152 from rebounding out of the trough into the raceway 147, after the revolving arm 152 has passed by the rear wall of the trough. To this end, the supporting member 148 between the arms 145 is terminated at a sufficient distance from the trough 142 to permit a device of substantially the width of the opening in the inner side wall of the trough, to be moved opposite said opening and practically close the same.

The closing device referred to is shown separately in Fig. 23 in plan, and is provided with a substantially vertical wall 160, rearwardly extended arms 161, inclined fingers 162 between said arms, and inclined or cam surfaces 163 adjacent said arms. The arms 161 are pivotally secured by screws 164 to the sides of the arms 145 of the raceway 147 and are normally elevated by springs 165. The inclined fingers 162 are arranged in the planes of the channels or grooves 156 so as to be engaged by the fingers 155 on the wiper arm 152, and to be initially depressed thereby and start the movement of the wall 160 downward so as to uncover the opening in the trough. The cam surfaces 163 are arranged so as to be engaged by the heads 15 of the wire blank 14 at or about the time the fingers 155 on the wiper arm 152 leave the inclined fingers 162, and on the further movement of the wiper arm 152, the headed blank is pushed forward in the raceway 147 toward the trough, and on this movement the heads of the wire blank ride over the cam surfaces 163 and effect the further depression of the vertical wall 160 into substantially the position shown in Fig. 21, in which position the headed blank is free to be forced or thrown by the wiper arm 152 into the trough 142. The raceway 147 is preferably inclined downwardly at its outlet, see Figs. 20, 21, so as to direct the headed blank toward the bottom of the trough. As soon as the heads 15 of the wire blank 14 pass off from the cam surfaces 163, the springs 165 move the closing device upwardly into its normal position shown in Fig. 20, in which the wall 160 practically closes the opening in the rear wall of the trough and blocks the headed blank from rebounding into the raceway, thereby ensuring proper delivery of the headed blanks from the rotor to the trough 142. The closing device in its normal position shown in Fig. 20 is held by the springs 165 against the front walls 146 of the raceway 147. The headed wire blank on its passage through the raceway 147, is pressed against the rear walls 145 by the spring pressed levers 149, which maintain the headed blank in correct position for entering the trough 142.

The trough 142 extends transversely with relation to the plane in which the rotor revolves and forms a runway through which the headed wire blanks are fed to the mechanism by which they are elongated, tapered, pointed and cut into individual nails of equal length, as will now be described.

The headed wire blanks 14 deposited into the trough 142 are fed forward by a feed mechanism, herein shown as a relatively thin eccentric or cam shaped disk 170, see Fig. 2, which extends up through a slot 171 in the bottom of the trough and is mounted on a rotatable shaft 172, located below the trough. The trough 142 passes through the side upright 17 of the framework and cooperates with a pair of rolls 173, 174, see Figs. 2, 24, 27 and 40, horizontally mounted in uprights 175 erected upon a base 176 forming part of the framework of the machine. The rolls 173, 174 are designed to elongate the headed blank 14 shown in Fig. 61 into the condition shown in Fig. 62 and at the same time form two substantially flat tapering opposing surfaces 177, 178, after which the headed wire blank is fed by the rolls 173, 174 through another section 179 of the trough to a second set of horizontally arranged rolls 180, 181 which are designed to still further elongate and taper the headed wire blank as represented in Fig. 63.

The second set of rolls 180, 181 are supported by uprights 182 erected upon the base 176. The elongated and tapered headed wire blank shown in Fig. 63 is fed by the rolls 180, 181 through a third section 183 of the trough to a third set of rolls 184, 185, see Figs. 26 and 29, which are vertically arranged at right angles to the first and second sets of tapering rolls, and are designed to compress the parallel straight sides of the elongated headed wire blank substantially at the longitudinal center thereof, and form point-forming recesses 205, see Fig. 64, to thereby still further elongate said blank and shape the points of two nails connected at their points. The connected nails thus formed and shown in Fig. 64 are fed by the rolls 184, 185 through a fourth section 187 of the trough to two cutting disks or rolls 188, 189, see Figs. 2, 31 and 42, which are vertically arranged and supported by an upright 190 erected upon the base 176.

The disks or rolls 188, 189 are provided with suitable cutters, as will be described, which sever the nail blank shown in Fig. 64 to form two nails, which are fed out of the machine by the said cutting disks or rolls, and may be assembled in any suitable manner.

The two sets of tapering rolls 173, 174, 180, 181 are constructed so that the heads 15 of the headed wire blank and given lengths of the wire blank adjacent said heads, will pass freely through the rolls and be unacted upon by them, while the remaining intermediate portion of the wire blank will be acted upon by the said rolls to form the opposing tapered surfaces 177, 178 and to elongate the blank.

The tapering rolls are also shaped so that the intermediate portion of the wire blank is initially engaged with a light pressure which is gradually increased toward the center and then gradually decreased from the center toward the rear end of the intermediate portion.

The two sets of tapering rolls are conventionally shown in Figs. 24, 25 and the outer surface of each is provided with a circular portion 191 of one radius, a circular portion 192 of a larger radius, and inclined portions 193 connecting said circular portions. The circular portion 192 of larger radius is provided with a channel or groove 194, which is suitably shaped to act on the wire blank in the manner desired.

In the present instance, the channel or groove 192 is substantially semi-circular in cross section at its opposite ends for a given or predetermined length of the groove and of the same radius as the headed wire blank 14, see Fig. 35, so as to render these portions of the groove or channel inactive upon the portions of the wire blank adjacent the heads thereof. The semi-circular portions of the first set of rolls 173, 174 extend from the ends of the groove or channel 194 to about the points marked 195, see Figs. 24 and 32.

From the points 195 to the center of the channel or groove 194, the depth of the latter is gradually and continuously decreased to form an eccentric or cam groove by which the wire blank is tapered in opposite directions from the center of the blank, and said groove or channel is also so shaped in cross section as to impart to the tapered portions 177, 178 of the wire blank the cross sectional shape desired.

In the present instance, the cross sectional shape of the tapered portions 177, 178 of the wire blank is more or less elliptical and approximates closely that of a flat surface, see Fig. 36. The circular portion 192 of larger radius is also provided at its opposite ends with deeper and wider depressions or grooves 197, which form continuations of the groove 194 and serve to receive the heads 15 of the wire blank. The circular portion 191 of smaller radius is made of such size as to permit of the free passage of the headed wire blanks between the tapering rolls, when the portions 191 of the rolls of each set are opposed to each other as represented in Fig. 25.

The tapering rolls 180, 181 are provided with similar cam grooves 194 and head receiving depressions 197, except that the cam grooves 194 are made longer and shallower than the cam grooves 194 of the first set, as indicated in Fig. 25, inasmuch as they are to increase the length and decrease the thickness of the tapered intermediate portions 177, 178 of the headed wire blank, see Fig. 63, and therefore the circular portion 192 of larger radius of the rolls 180, 181 of the second set of tapering rolls, is made of greater circumferential length as represented in Fig. 25. It will be understood that the decrease in the depth of the cam grooves in both sets of tapering rolls is a gradual decrease and is only illustrated conventionally in Figs. 24, 25.

Both sets of tapering rolls may and preferably will be provided with removable sections 200 forming part of the circular portions of larger radii, and located at the opposite ends of the cam grooves. The sections 200 are subjected to the greatest wear as they are the first and last portions of the rolls to engage the headed wire blank and can be quickly and easily replaced when they show indications of wear, so as to avoid irregularity in the product produced by the machine.

The cam or tapering rolls of the two sets of rolls are rotated in the direction indicated by the arrows 201 in Figs. 24, 25, and it will be observed that the low or deeper part of the cam groove in each roll at one end thereof engages the wire blank with a relatively light pressure, which is gradually increased to the high part of the cam groove and from the high part of the cam groove the pressure gradually decreases to the other end of the cam groove.

In the second set of rolls 180, 181, the variation in the cam groove at its high point is so slight, that the central portion of the tapered wire blank where the two opposite tapers 177, 178 meet, is substantially flat for a short distance on opposite sides of the longitudinal center of the wire blank, see Fig. 63, and this central portion is next subjected to the action of the set of point-forming rolls 184, 185, which are arranged vertically on opposite sides of the path of movement of the tapered wire blank, see Figs. 26, 29, in position to act on the blank in a direction at right angles to that in which the tapering rolls act on said blank.

The set of rolls 184, 185 are provided with circular portions 191, 192 of smaller and larger radii, and connecting inclined portions 193, similar to the cam or tapering rolls. The portions 192 of larger radius of the rolls 184, 185, are provided at their opposite ends with head receiving depressions 202 and with connecting annular grooves 203, whose bottom walls are provided substantially at the longitudinal centers of the grooves with curved projections or compressing members 204, which serve to compress the sides of the substantially flat center portion of the tapered wire blank.

The projections or compressing members act simultaneously on the opposite straight or parallel sides of the tapered wire blank, and squeeze the said sides so as to form the curved recesses 205 therein, see Figs. 34 and 64, and thereby still further elongate the tapered blank and at the same time provide the said blank with two connected points as represented in Fig. 64.

Provision is made for preventing the metal displaced by the compressing or point forming members 204 from spreading laterally beyond the width of the tapered portions of the blank, and to this end the rolls 184, 185 are provided with retaining walls 206, one on each roll, which are located on opposite sides of the longitudinal center of the grooves 203 in the rolls, see Fig. 29$^b$, and confine the metal within the space between said walls, see Fig. 29$^a$, which space is equal to the width of the tapered sides of the wire blank.

The compressing members 204 and the retaining walls 206 being subject to wear are preferably made on inserts or blocks 207, see Fig. 29, which are dovetailed into the rolls 184, 185 and firmly secured therein in any suitable manner. The retaining walls 206 project beyond the peripheries of the rolls 184, 185, and the latter are provided with recesses 600 for the reception of the walls 206 in the revolution of said rolls. The wire blank after leaving the point-forming rolls 184, 185, is in substantially the condition represented in Fig. 64, and is a finished blank comprising two opposing wire nails connected at their points, and said finished blank is then fed to the cutting mechanism to sever the blank at its longitudinal center and form two individual nails.

In the present instance the cutting mechanism is shown as two rotary disks or rolls 188, 189, see Figs. 31 and 42, arranged in line with the point-forming rolls 184, 185 and between which the finished wire blank is fed by the succeeding wire blanks, after the manner represented in Fig. 31, and said disks or rolls carry suitable cutters 210, 211, which cooperate to sever the finished blank at its center and form two individual nails, represented in Fig. 65.

In the present instance the cutters 210, 211 are firmly secured in suitable recesses in the disks 188, 189 by clamping caps or plates 212, 213, see Figs. 42, 43 and 44, and said cutters extend to substantially the center of the space between the disks, with their cutting edges opposed to each other. The outer ends of the cutters 210, 211 are curved to conform to the curvature of the recesses 205 in the sides of the finished nail blank.

One of the disks as 189 carries a device 214 for centering the finished nail blank with relation to the cutters, which device is similar in shape to the cutters and is in sliding engagement with the cutter 211 and has a curved outer end to engage the walls of the side recess 205 in the finished blank in advance of the cutter 211, so as to slightly move the finished nail blank longitudinally if the said blank should be slightly displaced, and bring the point-forming portion of the finished blank into position to be cut at its center by the cutters 210, 211. The centering device 214 is movable longitudinally in one direction by a spring 215 and in the opposite direction by the cutter 210 acting on the front nail 216 as represented in Fig. 42. The movement of the centering device 214 in opposite directions is limited by the end walls of a slot 217 engaging a pin 218 extended therein.

In the present instance, one of the cutter carrying disks or rolls as 188 is fixed by a dowel 219 and bolts 220 to a gear 221 on a shaft 222, and the other cutter carrying disk 189 is mounted on its gear 223, so as to be capable of a slight rotary movement to enable the cutter 211 and centering device 214 to be properly adjusted with relation to the cutter 210 carried by the fixed disk 188. To this end, the disk 189 is provided with elongated slots 225 through which the dowel pin 226 and bolts 227 are extended, and said disk carries two adjusting screws 228 which engage the dowel pin 226, see Figs. 42 and 47, and by means of which the disk 189 can be turned on its gear 223 about the shaft 229, so as to properly position the cutter 211 and centering device 214 with relation to the cutter 210.

Provision is made for feeding the rear nail 216 through the cutting disks or rolls. To this end, the cutter carrying disks 188, 189 are provided with movable circumferential sections or shoes 230, 231, which are extended into slots 232 in the peripheries of the disks and have in their outer surfaces suitable grooves 233 for the reception of the parallel sides of the rear nail. The shoes 230, 231 are yieldingly engaged with the rear nail by springs 234 located in suitable sockets in the disks 188, 189 and provision is made for the shoes to have a pivotal movement and also a bodily movement. To this end, the shoes 230, 231 are provided with radial slots 235 through which extend pivot pins 236, and said slots are made longer than the diameter of the pins 236 to permit of a limited bodily movement of the shoes. The shoes are further provided near their opposite ends with pins 237 which are extended into openings 238 in the side walls of the slots 232, and said openings are of materially greater diameter than the pins 237 to permit the shoes to turn upon their pivots 236. The shoes 230, 231 are located on the disks 188, 189 so that their front ends are in close proximity to the cutter 211, and normally said shoes are pressed outwardly by their springs 234. When the nail blank is severed by the cutters 210, 211, the pointed end of the rear nail 216 is moved laterally by the cutter 211 toward the shoe 230 and away from the shoe 231 as represented in Fig. 42.

On the continued revolution of the disks 188, 189 in the direction of the arrows 240 in Fig. 42, the front nail is moved forward by the cutter 210 and when the latter is moved out of engagement with the rear nail, the latter is centered with respect to the shoes by the shoe 230 under the influence of its spring 234, thereby causing the rear nail to be engaged at its opposite parallel sides by both shoes, which feed the nail through the cutting disks. The shoes 230, 231 are made of a circumferential length less than the length of the nail, and the rear ends of the shoes are separated from the end walls of the slots 232 in which the shoes are located, by sufficient spaces for the reception of the head of the nail. The bodily movement of the shoes, which is permitted by the pivot pin slots 235, ensures proper gripping of the rear nail by the portions of the shoes in radial lines with the pivot pins 236.

The nails when delivered from the machine may be nested together as represented in Fig. 65 for convenience in shipping.

When the headed wire blank has passed through the first set of tapering rolls 173, 174, it is provided with the opposing tapered portions 177, 178, as shown in Figs. 32 and 62, and to ensure that these tapered portions are properly presented to the second set of tapering rolls 180, 181 so that the taper-forming portions of the latter rolls will engage the portions 177, 178 of the headed blank tapered by the first set of rolls, provision is made for frictionally engaging the opposing tapered surfaces of the headed wire blank. To this end, devices are provided between the first and second set of tapering rolls for engaging the opposing tapered surfaces of the headed wire blank. These devices are shown in Fig. 48 as levers 250 pivoted at their rear ends to plates or blocks 251, fastened to the top and bottom walls of the trough section 179, and provided at their front ends with fingers 252, which project into the trough section 179, through slots 253 in said top and bottom walls, and have their inner and opposing faces of substantially the same shape as the tapered surfaces 177, 178 of the headed wire blank, with which they are engaged by the springs 254 mounted on rods 255 attached to the top and bottom walls of the trough section 179. The pressure or tension of the springs 254 may be adjusted by nuts 256, so as to cause the fingers 252 to firmly hold the tapered wire blank from turning in the trough section without interfering with the feed of the wire blank through the trough section. The fingers 252 are provided with beveled surfaces 258, which are engaged by the heads 15 of the wire blank to open up the said fingers and permit the heads of the wire blank to pass between the fingers, which are then closed upon the blank by the springs 254 as soon as the head at the front end of the wire blank has passed by the fingers. A similar device is used with the trough section 183 located between the second set of tapering rolls 180, 181 and the point-forming rolls 184, 185.

The wire blanks supplied to the rotor are cut from a continuous length of wire, which in practice will be in the form of a coil of wire as the latter comes from the wire mill. To ensure the coiled wire being straight when presented to the rotor, it is preferred to provide the apparatus with mechanism, as will be described, for straightening the wire after it is unwound from the coil. In the present instance, two straightening mechanisms for the wires 90, 91 are shown, but as they are of like construction, a detailed description of one will suffice.

As the wire 90 leaves the coil of wire, not shown, it is provided with two curves, one of which may be designated the circumferential curve and the other the helical curve, due to the fact that as the wire is wound upon the usual reel, not shown, it is also helically wound as the coil increases in thickness.

The straightening mechanism shown in Figs. 55 to 59 is provided with two members 260, 261, which are designed to straighten these two curves in the wire. The member 260 consists of a series of disks or rolls, herein shown as four in number, with two rolls 262, 263, arranged on one side of the path of movement of the wire 90 and two rolls 264, 265 arranged on the other side. The rolls 262, 264 are arranged opposite each other and the rolls 263, 265 are arranged out of line and so that the circumferential curve is straightened out by the latter rolls. To reduce friction the wire rests upon rollers 266 located in slots 267 in the table 268 and projecting slightly above the same, see Figs. 57 and 58. The straightening rolls 263, 265 are each provided with an annular flange which serves to hold the wire 90 down on the anti-friction rolls 266 and each of the straightening rolls is loosely mounted on a vertical shaft 269 erected upon the table 268.

The member 261 of the straightening mechanism comprises a substantially large roll 270 provided with an annular groove 271 for the reception of the wire 90, and also comprises a plurality of smaller rolls 272, 273, 274 having ungrooved peripheries and arranged to engage the wire 90 on the side opposite to the large roll 270. The rolls 272, 273 are located on opposite sides of the point of contact of the wire 90 with the large roll 270 and at substantially equal distances from said point, and the roll 274 is located between said point and the roll 273. The rolls are mounted on a table 275, which is attached to a disk 276 extended substantially at right angles to the said table and provided with a hollow shaft or tube 277, which is mounted to turn in a bracket 278 attached to the upright 17 of the rotor. By turning the disk 276, the table 275 can be adjusted into different inclined positions, so as to position the rolls carried by the table with relation to the helical curve in the wire 90 to effectively remove the same and thereby straighten out the wire, so that when it leaves the straightening member 261, it is perfectly straight and in this condition passes through the hollow shaft or tube 277 to mechanism which feeds it to the blank forming mechanism. The roll 272 is capable of adjustment toward and from the path of movement of the wire 90 on the passage of the latter to the grooved roll 270, and to this end the roll 272 is mounted on a shaft 279 erected upon a block 280, which is slidable in a slot 281 in the table 275 and is moved by an adjusting screw 282.

The table 275 may be held in its adjusted position by means of a nut 283 on a bolt 284 extended through a curved slot 285 in said disk, in a manner well understood.

The wire 90 is drawn through the straightening mechanisms 260, 261 and fed into position to be cut into wire blanks 14 for the rotor, by a wire feed mechanism shown separately in Fig. 54 and consisting of two rolls 290, 291 provided with annular grooves 292 and mounted on shafts 293, 294 supported in the framework of the machine.

The feed rolls 290, 291 are positively driven as will be described, and provision is made for slipping the feed rolls when the end of the wire 90 abuts against the disk 105 previous to the wire being cut to form the blank for the rotor, as above described.

To this end, the shaft 293 of the upper feed roll 290 is mounted in boxes 297, which slide in the framework 298 and are yieldingly backed up by springs 299, which permit the upper feed roll 290 to slip upon the wire 90 and become ineffective to feed the latter, when the wire is arrested by engagement of its front or free end with the disk 105. The slip feed produces an intermittent movement of the wire 90, and allows the wire to be stationary while the cutter 92 and its cooperating lifting crank or arm 104 are being revolved into operative relation to the wire to cut off the blank 14 therefrom and carry it to the rotor as above described. As soon as the cut-off blank 14 has been removed from the path of the wire 90, the feed rolls 290, 291 again become effective to feed the wire forward into position to have the next wire blank cut therefrom.

Drive.

The operative parts of the machine may be driven from a prime mover which is hereinshown as an electric motor 300, see Fig. 1, mounted upon the cap piece or top plate 301 forming part of the framework of the machine.

Referring to Fig. 1, the motor shaft 302 drives a counter shaft 303 by the link chain 304. The counter shaft 303 has fast on it a gear 305, which drives a gear 306 on a shaft 307 and a gear 308 on a shaft 309. The shaft 307 has fast on it two pinions 310, which mesh with large gears 311 attached to the members 10 of the rotor, and form a top drive for the latter. The shaft 309 is provided with pinions 312, which mesh with the large gears 311 and form a bottom drive for the rotor. It will thus be seen that a top and bottom drive is provided for the rotor which latter is of substantial weight and is designed to be driven at a relatively high speed. The bottom shaft 309 of the rotor drive acts as a prime mover for the wire feed mechanism, and to this end, the shaft 309 is provided with a pinion 313 represented in Fig. 53, which drives a gear 314 on a shaft 315 provided with a bevel gear 316, which drives a bevel gear 317, see Fig. 54, on a shaft 318, having a second bevel gear 319, which drives a bevel gear 320 on a shaft 321, provided with a second bevel gear 322, which drives a bevel gear 323 on a shaft 324. This shaft 324, see Fig. 54, has fast on it a spur gear 325, which drives a spur gear 326 on the shaft 294 of the feed roll 291. The shaft 294 has a second spur gear 327, which drives a spur gear 328 on the shaft 293 of the feed roll 290. The shaft 324 has mounted on it the feed roll 330 of the second set of feed rolls for the wire 91, and also a spur gear 331, which drives the spur gear 332 on the shaft 333 of the feed roll 334 of said second set of feed rolls. The shaft 333 is supported in sliding boxes 335, which are yieldingly backed up by springs 336 to enable the feed rolls 330, 334 of the second set to slip, the same as described with reference to the feed rolls 290, 291 of the first set.

The shaft 94 carrying the cutters 92 and the supporting cranks or arms 104 for the wire blanks 14 cut from the upper and lower wires 90, 91 are driven as follows:—The shaft 315 has fast on it a pinion 340, see Figs. 1 and 51, which drives a gear 341, which in turn drives a gear 342 on the shaft 24 carrying the cutter 92 and supporting crank 104 cooperating with the wire 91 fed by the lower or second set of feed rolls 330, 334. The gear 342 drives a pinion 343 on a shaft 344 provided with a balance wheel 345, and the pinion 343 drives a gear 346 on the shaft 94 carrying the cuter 92 and supporting crank 104 cooperating with the wire 90 fed by the upper or first set of feed rolls 290, 291.

The shaft 154 carrying the wiper 152 which delivers the headed wire blank from the rotor into the trough 142, is driven from the shaft 309 of the bottom drive for the rotor as follows:—The shaft 309 has a large gear 350, see Figs. 2 and 50, which drives a like gear 351 on a shaft 352, provided with a gear 353, which drives a gear 354 on a shaft 355 having a bevel pinion 356, which drives a bevel pinion 357 on a shaft 358 provided with a bevel pinion 359, which drives a bevel pinion 360 on the shaft 154 carrying the wiper 152. The shaft 172 carrying the feed cam 170 is driven from the shaft 355 by a bevel bevel pinion 800, see Fig. 2, which meshes with a bevel pinion 801 on a shaft 802, provided with a bevel pinion 803 which drives a bevel pinion 804 on the shaft 172.

The drive for the tapering rolls 173, 174 is as follows:—The shaft 352 has fast on it a bevel gear 360, see Figs. 2 and 50, which drives a bevel gear 361 on a shaft 362 provided with a spur gear 363, which drives a spur gear 364 on the shaft 365 of the lower tapering roll 174 of the first set of tapering rolls. The shaft 365 has a gear 366, which drives a gear 367 on the shaft 368 of the upper tapering roll 173 of the first set of tapering rolls.

The shaft 352 also drives the second set of tapering rolls 180, 181 in the same manner as the first set.

The drive for the point-forming rolls 184, 185 is as follows: The bottom driving shaft 309 for the rotor, has fast on it a bevel gear 370, see Figs. 2 and 50, which drives a bevel gear 371 on a vertical shaft 372 provided with a spur gear 374, which meshes with a spur gear 375 on the shaft 376 of the compressing roll 184, and the shaft 376 has a spur gear 377, which drives a spur gear 378 on the shaft 379 of the compressing roll 185.

The drive for the cutting disks or rolls 188, 189 is as follows:—The shaft 352, see Fig. 2, has fast on it a bevel gear 380, which drives a bevel gear 381 on a vertical shaft 382 provided with a spur gear 383, see Fig. 52, which drives the gear 221 of the cutting disk 188 and the gear 221 drives the gear 223 of the cutting disk 189.

As above pointed out, the rotor carries four sets of gripping jaws 12, 13 arranged in the form of a square as represented in Fig. 3, and these four sets of jaws, marked a, b, c and d, have cooperating with them two sets of wire feeding and cutting mechanisms, which are arranged to supply wire blanks from two sources, to wit, the upper and lower wires 90, 91. The wire blanks are alternately cut from the two wires, and are supplied to succeeding sets of gripping jaws, and therefore, the blanks cut from each wire are supplied to alternate sets of jaws, the blanks cut from the upper wire 90 being supplied to the two opposing sets of jaws a, c, and the blanks from the lower wire 91 being supplied to two opposing sets of jaws b, d, which are located substantially at right angles to the opposing sets of jaws a, c.

It will therefore be seen, that four wire blanks are supplied to the rotor, on each revolution of the latter, and that after the first revolution four hundred wire blanks are produced by the rotor and fed to the tapering, point-forming and cutting rolls, with the result that a maximum number of nails may be produced in a minimum time at a minimum cost.

It will be understood, that each of the four sets, *a, b, c* and *d*, of gripping jaws shown in Fig. 3, has cooperating with it, a pair of headers 70, and a pair of transfer arms 80, but to avoid confusion, only one transfer arm 80 is shown in Fig. 3.

The operation of the machine upon the wire 90 may be briefly described as follows:—The wire 90 is drawn through the rolls of the straightening members 260, 261 by the feed rolls 290, 291 and fed through the stationary cutter or bushing 102, until the wire strikes the disk 105, whereupon the feed rolls slip on the wire. The portion of the wire between the disks 101, 105 is then cut off by the revolving cutter 92 and the wire blank 14 is formed. This wire blank is then carried upwardly by the cutter 92 and crank 104 past the knock off fingers 116 into the pathway 107, where it is engaged with the presser fingers 113. The wire blank 14 is carried through the pathway 107 and into position to be picked up by the lifting fingers 57 on the stationary jaw 13 of one set, as *a*, of gripping jaws. The wire blank 14 is carried upwardly by the lifting fingers into engagement with the spring arms 123 and cam 124 and is moved by the latter into the groove 47 of the stationary jaw 13. At or about the time the wire blank 14 is placed in the groove of the stationary jaw 13, its opposite ends are engaged by the headers 70, which center the wire blank 14 with relation to the stationary jaw, so that the portions of the wire blank which project beyond the sides of the stationary jaw are of equal length. When the wire blank 14 has been centered on the stationary jaw 13, the movable jaw 12 is closed to firmly grip the wire blank between it and the stationary jaw and hold it stationary while the heads 15 are being formed by the headers 70, which are simultaneously moved toward the gripping jaws to compress the projecting end portions of the blank against the gripping jaws 12, 13 and thus provide the wire blank with heads 15 at its opposite ends.

The headers 70 are now withdrawn and the transfer arms 80 are properly positioned by the cams 86 to engage the heads of the wire blank, so as to support the same and permit the movable jaw to be opened and the headed wire blank to be removed from the grooves 47 in said jaws by the strippers 49, 50. On the continued rotation of the rotor, the headed wire blank 14 is removed from the transfer arms 80 and delivered by the wiper arm 152 into the trough 142, through which it is fed by the cam 170 to the first set of tapering rolls 173, 174 which gives it the initial taper and elongates it into the condition represented in Fig. 62. The wire blank is next fed through the second set of tapering rolls 180, 181 by which it is further elongated and tapered into the condition represented in Fig. 63. The tapered wire blank is next fed through the compression or point-forming rolls 184, 185 by which it is still further elongated into the condition represented in Fig. 64, and is then fed to the cutting rolls 188, 189 by which it is severed into two nails of like construction and such as is represented on an enlarged scale in Figs. 66 and 67. Each complete nail is provided with a head 15, a cylindrical body portion 14 adjacent the head, two opposing tapering sides 177 or 178 of greater length than the cylindrical body portion, with two parallel straight sides 400 at right angles to the tapering sides 177 or 178, and separated the full diameter of the body portion 14, and with a centering or penetrating point having tapering or curved sides 401, which are substantially at right angles to the tapered sides 177, and merge with an edge 402 whose greater dimension runs substantially at right angles to said tapered sides. The tapering sides 177 may and preferably will be provided with nurling 404, see Fig. 67, which may be formed by the second set of tapering rolls 180, 181, whose cam surfaces are suitably made for this purpose.

By reference to Figs. 66 to 69, it will be seen that the nail produced by the machine is a wire nail having structural and functional features of a cut nail, in that, the full diameter of the wire is maintained from the head to the point to provide the nail with substantially straight parallel sides, and in that tapering sides substantially at right angles to the parallel sides are provided which extend from the point toward the head and merge with the body portion thereof.

By reference to Figs. 60 to 64, the economical value of the method herein described for producing wire nails becomes apparent, for it will be seen that the wire blank used is of a length materially less than that necessary for the making of two nails of standard length by the methods now employed and known to me. This wire blank is first compressed in the direction of its length to form the heads 15, and the headed blank is thereby made materially shorter than the original or unheaded wire blank. The headed blank thus formed is then elongated beyond the length of the original blank, and to such length as will permit it to be cut into two nails of the desired or standard length. It is preferred as above described to effect the elongation step by step, but it is not desired to limit the invention in this respect. Furthermore, the metal of the portion of the blank which is elongated and tapered is manipulated by the action of the tapering rolls, and thereby hardened and toughened, which enables nails made from steel wire, and also from the softer metals, such as copper, to be greatly improved.

The machine acts upon the lower wire 91 in the same manner as above described with relation to the upper wire, and as the spring arms 123 which cooperate with the upper pathway 107, see Fig. 6, are secured at their lower ends to the lower arm 108 of the pathway 107 for the blank cut from the lower wire 91 they possess little spring action and therefore, additional means are provided for ensuring the blank cut from the lower wire 91 being properly positioned on the lower wall 108 of the lower pathway 107 and prevented from being thrown out of position when the wire blanks strike the shoulder 122 on the lower wall 108. To this end, triggers or levers 410 are provided, see Figs. 6 and 9, which are pivoted to the lower presser fingers 113 and cooperate with the lower wall 108 of the lower pathway 107 and with the spring arms 123. These triggers are normally held by springs 412 against stops 413 and are capable of being moved by the blank cut from the lower wire 91, when the said blank is carried past the triggers by the lifting fingers 57 on the stationary jaw 13 of the sets $b$, $d$ and are returned to their normal position by the springs 412. The blank cut from the lower wire 91 is carried by the lifting fingers 57 up between the spring arms 123 and the bearing members 131 and into engagement with the cams 124.

The tapering rolls 173, 174, 180, 181, may and preferably will be made as represented in Fig. 40, wherein one set of rolls as 173, 174 is shown in section, and wherein the upper roll 173 is represented as yieldingly supported by springs 700, and adjustable toward the lower roll 174 by screws 701. Provision is made for rotating the lower roll 174, so as to adjust the cam groove therein with relation to the cam groove in the upper roll, when the gear 367 on the latter is lifted out of mesh with the gear 366 on the lower roll, which is effected by the springs 700 after backing off the screws 701.

This rotary adjustment of the lower cam roll 174, may be accomplished by means of screws 702, see Fig. 41, carried by the gear 364 and engaging the bottom walls of recesses 703 in the shaft of the roll 174.

In the present instance, the grooves in the elongating rolls are shaped so that the headed wire blank is gradually varied in cross section from a circle near the headed end through a series of ellipses of increasing eccentricity to an ellipse of maximum eccentricity near the point, see Figs. 35 to 38, the major diameters of all of said ellipses being substantially equal to the diameter of the circular cross section. Furthermore, the cam grooves of said elongating rolls are constructed and arranged so that the wire blank is rolled continuously in one direction and is progressively reduced in cross-section from one end to a minimum at the middle, and progressively increased in cross section from said minimum toward the other end, whereby though tapered, the nail is hardened at the skin, grained and toughened by the rolling operation. So also the point-forming rolls intensify the condensation of the metal of that portion of the tapered blank which is to form the points of the nails, see Fig. 39, thereby ensuring a maximum hardness and toughness at the point of the nail.

Furthermore, by applying compression to the projecting ends of the wire blank while the latter for the greater portion of its length is firmly held against buckling by the gripping jaws, the density and integrity of the heads is symmetrical and does not vary between one nail and another, and rupture or separation of the metal at the junction of the head and the shank is avoided, which results in a head of maximum strength which is capable of standing the pull of drawing the nail. The regularity of the heads is also highly advantageous in nailing machines which automatically feed nails from a hopper through a chute to a nailing mechanism.

In the present instance I have illustrated one construction of machine with which the nails herein shown may be produced by the method herein disclosed, and while said construction may be preferred, it is not desired to limit the invention in this respect.

The illustration afforded by the above described machine and method embraces refinements and special particulars of operation and mechanism as well as the more essential and fundamental features. Significant sub-combinations of mechanical factors and analogous steps in process dwell within the comprehensive described assemblage. For example, if nails with small heads, or no heads at all, are to be fabricated, the roll-forging factors of machine and process, with mechanically appropriate changes in design, will be found fully capable of performing all of the operations needful to the manufacture of the product; and in such case the blank-transferring mechanism, and heading mechanism, hereinshown, may be dispensed with in whole or in part. In making claim for sundry sub-combinations of method and machine factors, I have in mind the practical value of such combinations when employed out of association with such other factors or functional departments of the machine and method herein described as an entirety.

Claims—

1. The method of making wire nails, which consists in compressing the ends of a wire blanks in the direction of its length to form heads at the opposite ends thereof, elongating the headed blank between its ends to form oppositely extended tapering portions between said heads, compressing the tapered blank substantially at right angles to the tapered portions to form opposing point-forming recesses substantially at right angles to said tapered portions, and severing said blank at said recessed portion.

2. The method of making wire nails, which consists in compressing the ends of a wire blank in the direction of its length to form heads at the opposite ends thereof, elongating the headed blank between its ends to form oppositely extended tapering portions between said heads, and severing said blank between the oppositely tapered portions.

3. The method of making wire nails, which consists in compressing a wire blank in the direction of its length to form heads at the opposite ends of the blank and to shorten the latter, elongating the shorter headed blank beyond the length of the unheaded wire blank, and severing the elongated blank substantially at the center thereof.

4. The method of making wire nails, which consists in compressing a wire blank in the direction of its length to form heads at the opposite ends of the blank and to shorten the latter, elongating the shorter headed blank beyond the length of the unheaded wire blank and providing the same with oppositely extended tapering portions, and severing the elongated blank between the said tapering portions.

5. The method of making wire nails, which consists in compressing a wire blank in the direction of its length to form heads at the opposite ends of the blank and to shorten the latter, elongating the headed blank and severing the same between its heads.

6. The method of making headed metal articles, which consists in compressing a metal blank in the direction of its length to form heads at the opposite ends of the blank, elongating the headed metal blank, and severing the elongated metal blank between its heads.

7. The method of making headed metal articles, which consists in compressing a metal blank in the direction of its length to form heads at the opposite ends of the blank, elongating the headed metal blank, compressing the elongated blank to still further elongate said blank and form a point-forming section of less width than that of said blank, and severing the elongated blank at the point-forming section.

8. The method of making headed metal articles which consists in upsetting heads on the ends of a metal blank, elongating the metal blank lengthwise by rolling between the heads to progressively reduce the cross section of the blank from one end to a minimum at the middle and progressively increasing the cross section of the blank from said minimum toward the other end.

9. The method of making headed metal articles which consists in upsetting heads on the ends of a metal blank, elongating the metal blank lengthwise by rolling between the heads to progressively reduce the cross section on the blank from one end to a minimum at the middle and progressively increasing the cross section of the blank from said minimum toward the other end, and initiating the reduction at a point spaced from one head, and terminating the reduction at a point similarly spaced from the other head.

10. The method of making headed metal articles which consists in upsetting heads on the ends of a metal blank, elongating the metal blank lengthwise by rolling between the heads to progressively reduce the cross section of the blank from one end to a minimum at the middle and progressively increasing the cross section of the blank from said minimum toward the other end, and producing a cross-sectional modification characterized by ellipses of eccentricity increasing from either end of the piece toward the middle, the major diameters of said ellipses being substantially equal to the diameter of the unreduced portion of the blank.

11. The method of making headed metal articles which consists in upsetting heads on the ends of a metal blank, elongating the metal blank lengthwise by rolling between the heads to progressively reduce the cross section of the blank from one end to a minimum at the middle and progressively increasing the cross section of the blank from said minimum toward the other end, and further reducing the cross section at the middle of the metal blank by swaging a point-section therein.

12. The method of making headed metal articles which consists in upsetting heads on the ends of a metal blank, elongating the metal blank lengthwise by rolling between the heads to progressively reduce the cross section of the blank from one end to a minimum at the middle and progressively increasing the cross section of the blank from said minimum toward the other end, and further reducing the cross section at the middle of the metal blank by swaging a point-section therein, and cutting the metal blank at the swaged point-section.

13. The method of making nails and the like from wire stock, which comprises feeding the stock endwise in one direction, elongating and tapering said stock, leaving untapered portions adjacent the large ends of the tapered portions and severing said stock between said tapered portions.

14. The method of making nails and the like from wire stock, which comprises feeding the stock endwise in one direction, elongating and tapering said stock in opposite directions, leaving untapered portions adjacent the large ends of the tapered portions and severing the stock between said tapered portions.

15. In an apparatus of the character described, in combination, means for holding a metal blank between its ends, means for compressing the ends of the metal blank to form heads at the opposite ends thereof, means for elongating the headed blank, means for severing the elongated blank to form individual articles, and means for feeding the headed blank to the elongating means.

16. In an apparatus of the character described, in combination, means for holding a metal blank between its ends, means for compressing the ends of the metal blank to form heads at the opposite ends thereof, means for elongating the headed blank and for providing the same with oppositely tapering portions, means for compressing the elongated blank substantially at right angles to said tapering portions, means for severing the headed blank at its compressed portions, and means for feeding the headed blank to the elongating means.

17. In an apparatus of the character described, in combination, a rotor having mechanism for providing a wire blank with heads at its opposite ends, a runway into which the headed wire blanks are deposited, means cooperating with the rotor for delivering the headed wire blanks into said runway, mechanism for elongating and tapering said headed wire blanks, means for feeding the headed wire blanks in said runway to said elongating and tapering mechanism, mechanism for compressing the tapered headed wire blank substantially at right angles to the tapered portions thereof, and mechanism for severing the tapered headed blanks at the compressed portions thereof.

18. In an apparatus of the character described, in combination, a rotor having mechanism for providing a wire blank with heads at its opposite ends, a runway into which the headed wire blanks are deposited, means cooperating with the rotor for delivering the headed wire blanks into said runway, mechanism for elongating and tapering said headed wire blanks, means for feeding the headed wire blanks in said runway to said elongating and tapering mechanism, and mechanism for severing the tapered headed blanks.

19. In an apparatus of the character described, in combination, mechanism for forming headed metal blanks from unheaded metal blanks, a runway into which said headed metal blanks are delivered substantially as fast as formed, mechanism for elongating and tapering the headed metal blanks, means for feeding the headed metal blanks in said runway to said elongating and tapering mechanism, and means for severing said tapered metal blanks.

20. In an apparatus of the character described, in combination, a rotor provided with gripping jaws for grasping a metal blank, headers carried by said rotor to move therewith and movable toward said jaws for compressing projecting ends of said metal blank to form heads on the opposite ends of the latter, devices for engaging the headed blank and for holding the latter after the said blank has been released by said gripping jaws, and means for removing said headed blank from said holding devices.

21. In an apparatus of the character described, in combination, a rotor provided with gripping jaws for grasping a metal blank, headers movable with said rotor, and also slidably mounted in the rotor to be bodily movable toward and from said jaws to compress projecting ends of said metal blank against said jaws, means for moving said rotor, and means for moving said headers toward and from said jaws.

22. In an apparatus of the character described, in combination, a rotor provided with supporting members spaced apart and provided with channels in their adjacent faces, a plurality of sets of gripping jaws located between said supporting members, carriers for said gripping jaws extended into said channels, a shaft upon which said supporting members are loosely mounted, cams mounted on said shaft between said supporting members, and means for operatively connecting said cams with said gripping jaws.

23. In an apparatus of the character described, in combination, a rotor provided with supporting members spaced apart and provided with channels in their adjacent faces, a plurality of sets of gripping jaws located between said supporting members, carriers for said gripping jaws extended into said channels, a shaft upon which said supporting members are loosely mounted, cams mounted on said shaft between said supporting members, means for operatively connecting said cams with said gripping jaws, headers carried by said supporting members and cooperating with said gripping jaws, and cams to move said headers toward said gripping jaws.

24. In an apparatus of the character described, in combination, gripping jaws provided with cooperating grooves in their adjacent faces to receive a metal blank therein, means for moving one of said jaws toward and from the other, and strippers carried by said jaws and cooperating with the metal blank to remove the latter from said grooves.

25. In an apparatus of the character described, in combination, a rotor, gripping jaws carried thereby to revolve therewith and one of which is movable with relation to the other, means for positioning a metal blank with relation to said rotor, means movable with rotor for lifting said metal blank, and means for directing the lifted blank between said gripping jaws.

26. In an apparatus of the character described, in combination, a rotor provided with gripping jaws for grasping a metal blank, means for feeding a continuous length of metal into the plane in which said rotor revolves, means for cutting said continuous length of metal to form a blank of predetermined length, means for carrying said metal blank toward said rotor, and means for positioning said metal blank between said gripping jaws.

27. In an apparatus of the character described, in combination, a rotor, mechanism mounted on said rotor for heading a wire blank at its opposite ends, mechanism for cutting said blank from a continuous length of wire and for bodily moving a cut blank of predetermined length toward said rotor and said heading mechanism, and mechanism for intermittently feeding said continuous length of wire to said blank cutting mechanism.

28. In an apparatus of the character described, in combination, mechanism for heading a wire blank, mechanism for cutting said blank from a continuous length of wire and for feeding a cut blank of predetermined length to said heading mechanism, mechanism for intermittently feeding said continuous length of wire to said blank cutting mechanism, and means for rejecting cut blanks of a length less than said predetermined length.

29. In an apparatus of the character described, in combination, a rotatable shaft, a cutter rotatable with said shaft, a cutter with which said rotatable cutter cooperates to cut a wire and form a wire blank, a crank rotatable with said shaft and cooperating with said rotatable cutter to support the free end of the wire from which the blank is cut, and to support one end of the cut blank, devices between said cutter and crank to form a pathway for the cut blank, and presser fingers for engaging the cut blank as it is being carried through said pathway.

30. In an apparatus of the character described, in combination, mechanism for heading a wire blank, mechanism for cutting said blank from a continuous length of wire and for feeding a cut blank of predetermined length to said heading mechanism, mechanism for intermittently feeding said continuous length of wire to said blank cutting mechanism, and a knock off cooperating with said pathway to engage the cut blank substantially at the entrance of said pathway.

31. In an apparatus of the character described, in combination, a support for a metal blank, a rotor provided with jaws for gripping said blank, and with means for lifting said blank and removing it from said support, and means for effecting movement of the metal blank on said lifting means and into said gripping jaws.

32. In an apparatus of the character described, in combination, a support for a metal blank, a rotor provided with jaws for gripping said blank between its ends, lifting fingers carried by said rotor for removing said blank from said support, spring arms for engaging the ends of the blank on said lifting fingers, and cams for moving said blank on said lifting fingers into said jaws.

33. In an apparatus of the character described, in combination, a support for a metal blank, a rotor provided with jaws for gripping said blank between its ends, lifting fingers carried by said rotor for removing said blank from said support, spring arms for engaging the ends of the blank on said lifting fingers, cams for moving said blank on said lifting fingers into said jaws, headers carried by said rotor for engaging the ends of said blank and centering it longitudinally between said jaws, means for closing the jaws after the metal blank has been centered, and means for moving the headers to center said blank while the jaws are open and to compress the projecting ends of the blank against the jaws after the latter have been closed upon the said blank.

34. In an apparatus of the character described, in combination, gripping jaws provided with cooperating grooves in their adjacent faces, means for moving one of said jaws with relation to the other, strippers movable with said jaws and cooperating with the same to effect removal of a metal blank from the grooves in said jaws when the latter are opened.

35. In an apparatus of the character described, in combination, gripping jaws composed of end sections and intermediate sections, blocks in which said end sections are supported, and removable cap plates for said blocks cooperating with said intermediate jaw sections to secure them to said blocks.

36. In an apparatus of the character described, in combination, gripping jaws composed of end sections and intermediate sections, blocks provided with jaw slots and with cap slots extended substantially at right angles to said jaw slots between the ends of the latter, to provide the jaw slot with bottom end walls for supporting the end sections of said jaws, and cap plates secured to said blocks in said cap slots and provided with projections forming the portions of the bottom walls of said jaw slots which support the intermediate sections of said jaws.

37. In an apparatus of the character described, in combination, gripping jaws provided with longitudinal grooves in their adjacent faces and with transverse slots, and stripping devices located in said slots and cooperating with a metal blank in said grooves to remove said blank therefrom when said jaws are opened.

38. In an apparatus of the character described, in combination, a rotor provided with supporting members, a shaft on which said supporting members are loosely mounted, gripping jaws located between and supported by said members, a cam fast on said shaft and operatively connected with one of said gripping jaws, headers carried by said supporting members and cooperating with said gripping jaws to head a metal blank grasped thereby, and cams to operate said headers.

39. In an apparatus of the character described, in combination, a rotor provided with supporting members, a shaft on which said supporting members are loosely mounted, gripping jaws located between and supported by said members, a cam fast on said shaft and operatively connected with one of said gripping jaws, headers carried by said supporting members and cooperating with said gripping jaws to head a metal blank grasped thereby, cams to operate said headers, holding devices movable with said supporting members to engage said headed blank after it has been released by said headers, and cams to operate said holding devices.

40. In an apparatus of the character described, in combination, a rotor provided with supporting members, a shaft on which said supporting members are loosely mounted, gripping jaws located between and supported by said members, a cam fast on said shaft and operatively connected with one of said gripping jaws, headers carried by said supporting members and cooperating with said gripping jaws to head a metal blank grasped thereby, cams to operate said headers, holding devices movable with said supporting members to engage said headed blank after it has been headed by said headers, cams to operate said holding devices, and means for removing said headed blank from said holding devices.

41. In an apparatus of the character described, in combination, a rotor provided with means for gripping a metal blank between its ends, for forming heads at the opposite ends of the said metal blank and for holding the headed blank, of a runway provided with an opening through which the headed blank is moved into said runway, a raceway between said runway and said rotor through which the headed blank is moved, and a wiper to wipe the headed blank through said raceway into said runway.

42. In an apparatus of the character described, in combination, a rotor provided with means for gripping a metal blank between its ends, for forming heads at the opposite ends of the said metal blank and for holding the headed blank, of a runway provided with an opening through which the headed blank is moved into said runway, a raceway between said runway and said rotor through which the headed blank is moved, a wiper to wipe the headed blank through said raceway into said runway, and a wall normally closing the opening in said runway and movable with relation to the latter to uncover said opening.

43. In an apparatus of the character described, in combination, mechanism for elongating and tapering a headed metal blank, a runway leading to said mechanism and through which the headed blanks are fed to said mechanism, and a cam disk extended into said runway and rotatable to feed the headed blanks therein to said tapering mechanism.

44. In an apparatus of the character described, in combination, mechanism for elongating and tapering a headed metal blank, a runway leading to said mechanism and through which the headed blanks are fed to said mechanism, and means for feeding the headed blanks through said runway to said tapering mechanism.

45. In an apparatus of the character described, in combination, blank-severing mechanism, blank-elongating and tapering mechanism, means to transfer blanks from the severing mechanism to the blank-elongating and tapering mechanism, and means to head the ends of said blanks during said transfer.

In testimony whereof, I have signed my name to this specification.

EDWARD I. BRADDOCK.